United States Patent [19]

Poeppelmeier et al.

[11] Patent Number: 4,648,960

[45] Date of Patent: Mar. 10, 1987

[54] BOUND ZEOLITE CATALYST AND PROCESS FOR USING SAID CATALYST

[75] Inventors: Kenneth R. Poeppelmeier, Edison; Walter G. Funk, Mountainside; John J. Steger, Pittstown; Shun C. Fung, Bridgewater, all of N.J.; Virginia R. Cross; Jar-Lin Kao, both of Houston, Tex.

[73] Assignee: Exxon Research and Engineering Company, Florham Park, N.J.

[21] Appl. No.: 837,780

[22] Filed: Mar. 10, 1986

Related U.S. Application Data

[62] Division of Ser. No. 550,952, Nov. 10, 1983, Pat. No. 4,595,668.

[51] Int. Cl.$^4$ .................................... C10G 35/06
[52] U.S. Cl. ........................................... 208/138
[58] Field of Search ................................ 208/138

[56] References Cited

U.S. PATENT DOCUMENTS

| | | | |
|---|---|---|---|
| 4,104,320 | 8/1978 | Bernard et al. | 208/138 |
| 4,347,394 | 8/1982 | Detz et al. | 208/138 |
| 4,443,326 | 4/1984 | Field | 208/138 |
| 4,447,316 | 5/1984 | Buss | 208/138 |
| 4,456,527 | 6/1984 | Buss et al. | 208/138 |
| 4,478,706 | 10/1984 | Cohen | 208/138 |

Primary Examiner—Curtis R. Davis
Attorney, Agent, or Firm—Jay Simon; E. Thomas Wheelock

[57] ABSTRACT

A class of bound catalysts which exhibit superior activity maintenance in dehydrocyclization reactions are defined as a type L zeolite having exchangeable cations of which at least 75% are selected from Group IA and calcium and barium cations and containing well dispersed particles of at least one Group VIII noble metal where at least 90% of the noble metal thereof is dispersed in the form of particles having a diameter less than 7 Å. The catalysts may also be identified as type L zeolites loaded with at least one Group VIII noble metal which have a terminal cracking index (as a measure of production of pentanes versus butanes from hexane) of at least 1.5.

5 Claims, 12 Drawing Figures

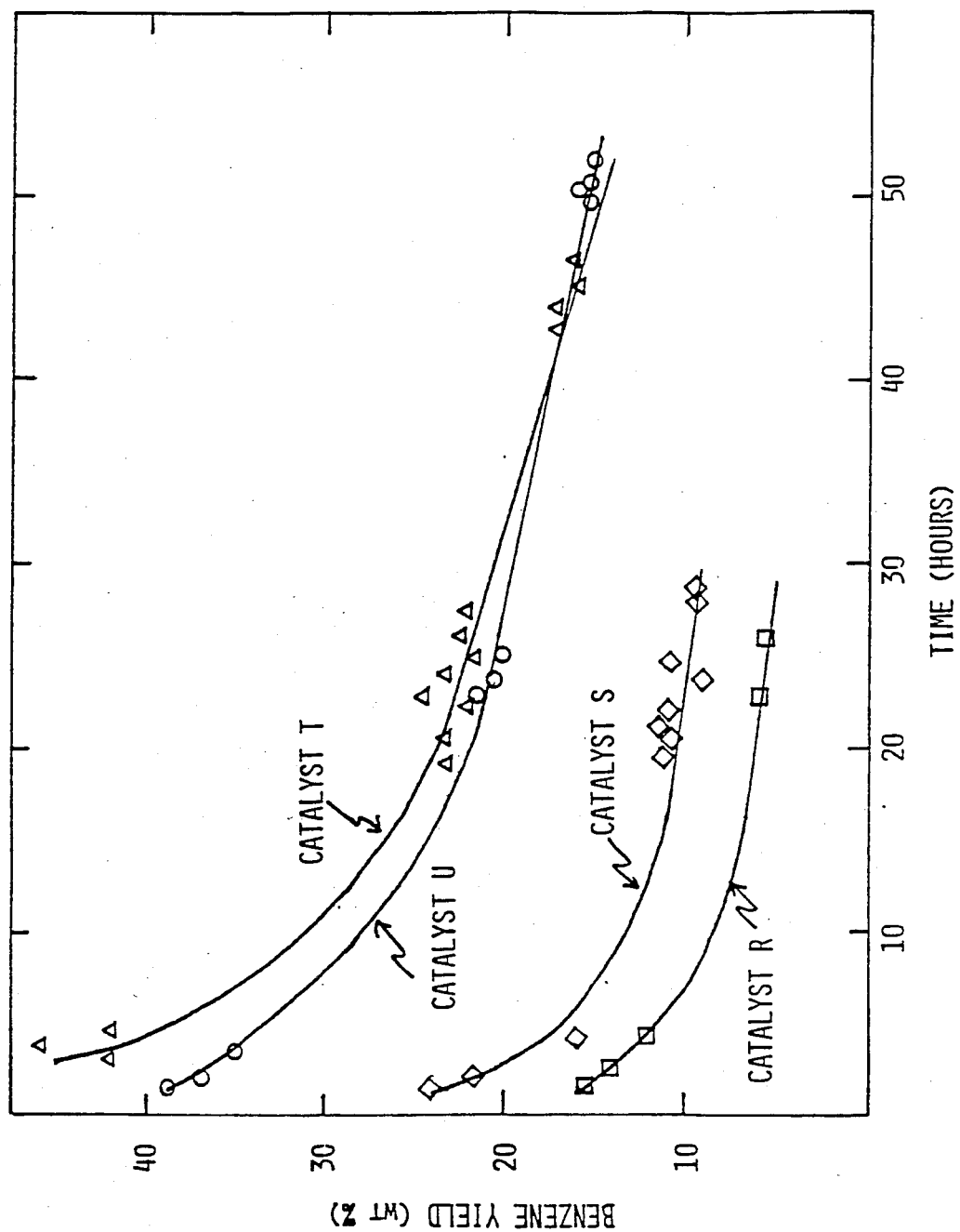

BOUND ZEOLITE CATALYST AND PROCESS FOR USING SAID CATALYST

This is a division of application Ser. No. 550,952, filed Nov. 10, 1983, now U.S. Pat. No. 4,595,668.

BACKGROUND OF THE INVENTION

1. Field of the Invention

This invention relates to a novel bound catalyst comprising a zeolite containing one or more Group VIII noble metals in which the noble metal is highly dispersed throughout the zeolite. This catalyst is capable of terminally cracking various organic compounds and exhibits a sustained activity maintenance under reforming conditions and improved selectivity for aromatization products.

2. Discussion of the Relevant References

Several materials have been employed as hydrocarbon conversion catalysts in such processes as reforming, catalytic dewaxing, alkylation, oxidation and hydrocracking. Examples of catalysts useful for this purpose include those materials comprising a catalytically active metal such as a Group VIII noble metal and optionally rhenium supported on or impregnated into a carrier.

Among the hydrocarbon conversion processes, catalytic reforming in the presence of hydrogen is one of the most important. Catalytic reforming is a refinery process designed to increase the octane number of naphtha. Typically in this process, the naphtha is passed over a suitable catalyst under reforming conditions for example, elevated temperatures and pressures, well known in the industry in the presence of hydrogen gas and a $H_2$/hydrocarbon mole ratio of 2 to 20. This process involves several different types of reactions, including isomerization, dehydrocyclization of paraffins to produce naphthenes and aromatics, dehydrogenation of cyclohexanes and other naphthenes and alkanes, isomerization/dehydrogenation of cyclopentanes, isomerization of normal paraffins to isoparaffins, and hydrocracking. Paraffin isomerization occurs relatively easily, but contributes only a limited improvement in octane number. The reforming reactions most important for the production of high octane components are those which produce aromatics.

The ideal reaction scheme minimizes the hydrocracking of long chain paraffins to gaseous hydrocarbons such as methane and ethane to improve the yield and selectivity to more valuable products of the other reforming reactions, particularly dehydrocyclization. Examples of known catalysts useful for reforming include platinum and optionally rhenium or iridium on an alumina support, platinum on type X and Y zeolites, provided the reactants and products are sufficiently small to flow through the pores of the zeolites, platinum on the intermediate pore size zeolites as described in U.S. Pat. No. 4,347,394 and platinum on cation exchanged type L zeolites.

While zeolite L catalysts, usually in their hydrogen form, have been employed as catalytic dewaxing catalysts and in other applications, they are particularly useful in reforming because they decrease the amount of hydroacracking which occurs during reforming. For example, U.S. Pat. No. 4,104,320 to Bernard et al. discloses that the use of zeolite L as a support increases the selectivity of the reaction for producing aromatic products. This improvement, however, has been made at the expense of catalyst life. This catalyst may be regenerated by subjection to a hydrogen treatment, oxidation, oxychlorination, calcining, water treatment, and reduction with hydrogen as disclosed in French Patent Publication No. 2,360,540 filed Sept. 9, 1981 to Bernard et al., or by hydrogen regeneration as disclosed in French Application No. 8,000,114 to Bernard. These regeneration techniques, however, have not been applied to freshly prepared catalysts which are defined for purposes herein as catalysts which have not been contacted with a hydrocarbon feed.

U.K. Application No. 82-14147 filed May 14, 1982 to Wortel entitled "Improved Zeolite L" teaches that a highly crystalline zeolite L material having a cylindrical morphology has an improved catalyst life for dehydrocyclization reactions over a conventionally prepared zeolite L disclosed in U.S. Pat. No. 3,216,789. U.S. patent application Ser. No. 426,211 filed Sept. 28, 1982 to A. Cohen entitled "Improved Zeolite L Catalyst for Reforming" discloses treating a zeolite L material with an alkali solution of pH of at least 11 prior to calcining the formed catalyst so as to improve the dehydrocyclizing activity of the catalyst. Finally, Belg. Pat. Nos. 895,778 and 895,779 disclose use of a barium-exchanged zeolite L catalyst for high yields in reforming, dehydrocyclization, dealkylation and dehydroisomerization.

SUMMARY OF THE INVENTION

The present invention represents an improvement over reforming catalysts and processes known in the art because it defines a class of bound catalysts which maintain catalyst activity toward the desired dehydrocyclization reaction for an extended period of time and possess a unique ability to favor terminal adsorption of reactant molecules on their active sites, thus improving activity and selectivity for reforming.

In one embodiment, the present invention relates to a bound reforming catalyst characterized by its improved catalyst activity maintenance which comprises a type L zeolite containing one or more Group VIII noble metals and which has a terminal cracking index, as defined further hereinbelow, of greater than about 1.5.

In a more specific embodiment, the present invention relates to a bound reforming catalyst comprising a type L zeolite having exchangeable cations of which at least 75 percent are selected from the group consisting of lithium, sodium, potassium, rubidium, cesium, calcium and/or barium cations, and containing at least one Group VIII noble metal from the Periodic Table of Elements, characterized in that the particles of the noble metal are well dispersed over the surface of the zeolite and at least about 90% of the noble metal is associated with the zeolite, and of the metal associated with the zeolite at least about 90% is inside the channels. Preferably more than 98% is inside the channels. The metal dispersed inside the channels is in the form of particles having a diameter less than about 7 Å.

Most preferably, the exchangeable cation is potassium and the Group VIII noble metal is platinum.

In a preferred embodiment a freshly prepared or deactivated catalyst can be treated by an enhanced dispersion technique described below so that the catalyst exhibits improved activity maintenance and dispersion properties. Freshly prepared catalysts are defined for purposes herein as catalysts which have not been contacted with a hydrocarbon feed. Electron micrographs of such a catalyst show that more than 98% of the noble metal, prior to or after reduction, is dispersed in the form of particles having a diameter less than about 7 Å and less than 2% is dispersed in the form of particles measured to have a diameter of 7 Å or greater.

The class of catalysts may be prepared by a variety of methods. Further, these catalysts may be contacted with a feedstock under reforming conditions to produce products resulting from enhanced terminal adsorption of the components of the feedstock onto the noble metal during the reaction. Use of the catalysts herein is particularly advantageous because of their unique activity maintenance and selectivity in converting reactant organic compounds containing at least six carbon atoms, such as hexane or heptane, into aromatic products. The high level of noble metal dispersion within the zeolite channels is believed to account for both the exceptional activity maintenance in reforming and aromatization reactions and the unique ability of the catalyst to promote cyclization reactions as indicated by the terminal cracking index as defined below.

BRIEF DESCRIPTION OF THE DRAWINGS

FIG. 12 represents a graphical plot of benzene yield in weight percent versus hours of four catalyst containing binders.

DESCRIPTION OF THE PREFERRED EMBODIMENTS

Figure 1:
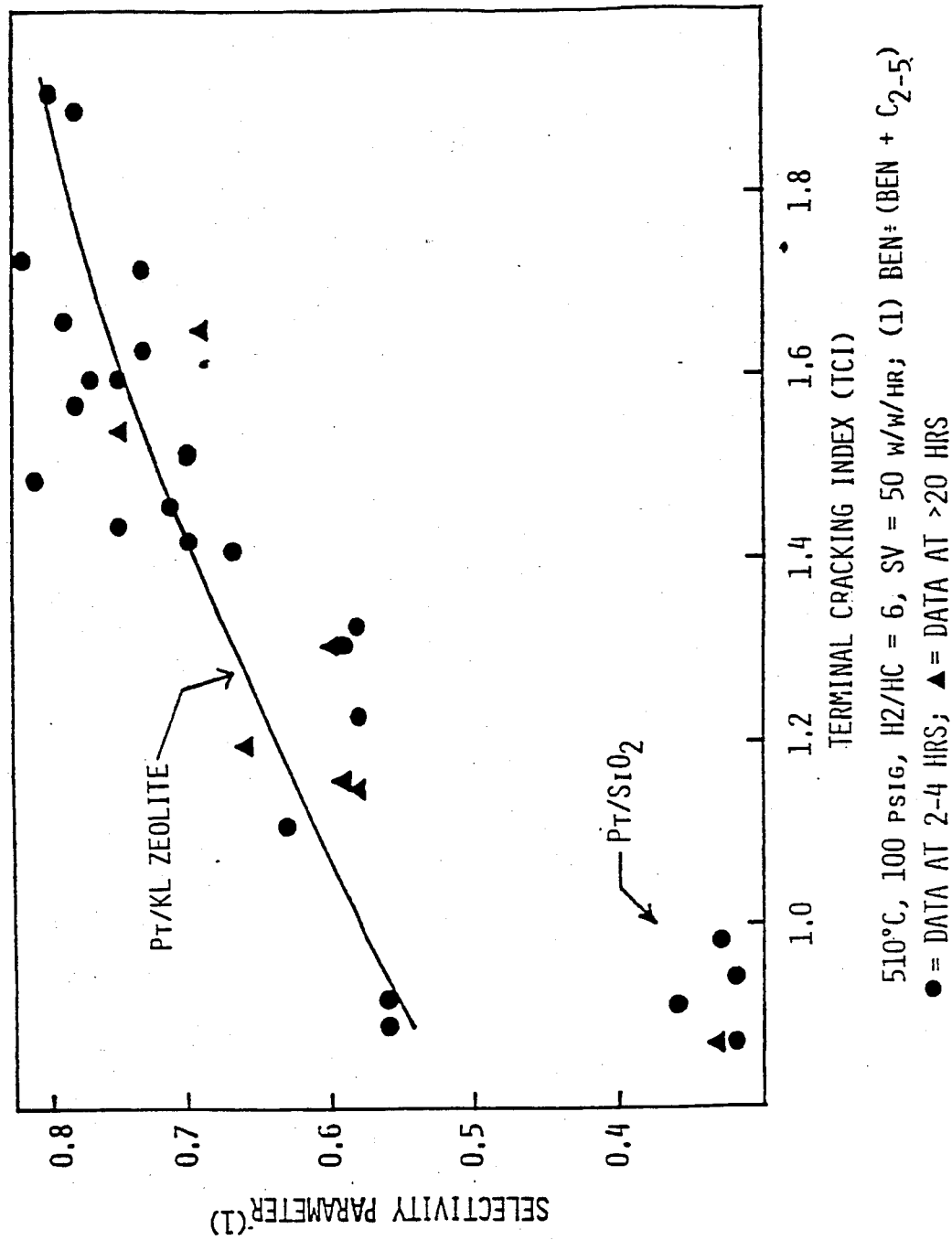
FIG. 1 represents a plot of the selectivity for benzene as measured by the selectivity parameter (weight ratio of benzene product to the sum of benzene plus $C_2$–$C_5$ products) achieved, as a function of the terminal cracking index (TCI) defined hereinbelow, for platinum on type L zeolites and for platinum on silica after a time on oil of either about 3 or about 22 hours.

The type L zeolites are defined herein as synthetic zeolites which crystallize in the hexagonal system with a characteristic x-ray diffraction pattern obtained from CuK radiation with the major d (Å) peak values set out in Table A:

TABLE A

| |
| --- |
| 16.1 ± 0.3 |
| 7.52 ± 0.04 |
| 6.00 ± 0.04 |
| 4.57 ± 0.04 |
| 4.35 ± 0.04 |
| 3.91 ± 0.02 |
| 3.47 ± 0.02 |
| 3.28 ± 0.02 |
| 3.17 ± 0.01 |
| 3.07 ± 0.01 |
| 2.91 ± 0.01 |
| 2.65 ± 0.01 |
| 2.46 ± 0.01 |
| 2.42 ± 0.01 |
| 2.19 ± 0.01 |

Thus, they share a common zeolitic structure. For purposes of this invention, type L zeolites have a general formula as follows:

$$0.9\text{--}1.3 M_{2/n}O:Al_2O_3:xSiO_2:yH_2O$$

where M designates at least one exchangeable cation, n represents the valence of M, y is any value from 0 to about 9, and x is disclosed as 5.2 to 6.9 in U.S. Pat. No. 3,216,789, but may be outside this range provided the x-ray diffraction pattern of the zeolite is the same as zeolite L. Thus, type L zeolites with $SiO_2/Al_2O_3$ ratios less than 5.2 or greater than 6.9 are applicable to this invention. Preferably, the $SiO_2/Al_2O_3$ ratio may vary between about 2 and about 50. For example, one method of reducing the $SiO_2/Al_2O_3$ ratio involves leaching some of the $SiO_2$ with an with an alkali metal hydroxide, e.g., KOH, to produce type L zeolite useful in this invention. A more complete description of zeolite L is provided in U.S. Pat. No. 3,216,789. Zeolite L has channel-shaped pores undulating from about 7 to 13 Å in diameter and may occur in the form of cylindrical crystals with a mean diameter of at least 0.5 micron and an aspect ratio of at least 0.5 (as described, e.g., in U.K. Application No. 82-14147, the entire disclosure of which is incorporated herein by reference), as well as in other sizes and shapes.

The type L zeolites are conventionally prepared such that M in the above formula is potassium. See, e.g., U.S. Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium and barium. More preferably, the cation is sodium, potassium, rubidium or cesium, still more preferably potassium, rubidium or cesium, and most preferably potassium. Optionally, the exchangeable cations may consist of mixtures of the above-named Group IA cations or mixtures of a Group IA cation and barium or calcium cations. These mixtures of cations may be achieved, for exaple, by treating the zeolite L with an aqueous solution containing a rubidium and/or cesium salt and then washing to remove excess ions. This ion exchange treatment can be repeated to effect further ion exchange, although to a lesser degree.

The Group VIII noble metals which are necessary for catalytic activity are those metals from Group VIII of the Periodic Table of Elements which are selected from osmium, ruthenium, rhodium, iridium, palladium and platinum. Preferably, the metals which are employed herein are platinum, rhodium or iridium, and most preferably platinum. The metals may be present in any combination desired. Rhenium, a Group VIIB metal, may also be present so long as at least one Group VIII noble metal is present.

The amount of Group VIII noble metal present in the catalyst will be an effective amount and will depend, for example, on required catalyst activity, ease of uniform dispersion, and the crystal size of the type L zeolite. Crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6% by weight of the catalyst, preferably 0.1 to 3.5%, and more preferably 0.1 to 2.5%. Furthermore, the amount of metal present is generally from 0.1 to 2.0% by weight of the catalyst, if the average zeolite crystallite size parallel to the channels is greater than about 0.2 micron, and from about 1.0 to 6% by weight if the average zeolite crystallite size parallel to the channels is no greater than about 0.2 micron.

The Group VIII noble metals may be introduced into the zeolite by, for example, ion exchange, impregnation, carbonyl decomposition, adsorption from the gaseous phase, introduction during zeolite synthesis, and adsorption of metal vapor. The preferred technique is ion exchange. In some cases, e.g., when the metal(s) have been introduced by an ion-exchange process, it is preferred to remove the residual acidity of the zeolite by treating the catalyst, which has previously been reduced by hydrogen, with an aqueous solution of an alkaline base such as potassium carbonate. This treatment will neutralize any hydrogen ions formed during the reduction of Group VIII noble metal ions by hydrogen.

The bound reforming catalyst of this invention is a unique composition characterized by several properties which lead to improve selectivity and activity maintenance over what is exhibited by other reforming catalysts outside the class defined herein under the same catalytic conditions. The greater the degree of dispersion of the metal within the channels, i.e., onto the internal surface area of the zeolite, the better will be the activity maintenance of the catalyst.

The activity of a catalyst is a measure of its ability to convert feed to products. While a catalyst may have a high activity, the products formed may not be necessarily the desired products. The term "selectivity" is a measure of the ability of the catalyst to convert feed to desired products. Activity maintenance concerns the ability of the catalyst to maintain a portion of its activity over time at conversion conditions, other variables remaining constant.

The decline in catalyst activity at conversion conditions is believed to be due primarily to crystal growth or agglomeration of the noble metal particles and secondarily to the formation of coke on the external and internal surfaces of the catalyst. At the same noble metal loading, catalysts containing particles or crystals of noble metals of size greater than that disclosed above are less active and less selective than catalysts containing the smaller particles. Coke formation, probably due to complex condensation and dehydrogenation reactions, results in the shielding of the noble metal from the reaction mixture, thereby limiting the catalytic sites available for promoting reactions.

As catalyst activity declines by virtue of agglomeration and coke formation, the yield of desirable products will decline, and depending upon the economics of the operation a process employing the catalyst will have to be interrupted and catalyst activity restored to its initial value. Generally, catalytic activity can be maintained by increasing temperature, but there are limits beyond which the temperature cannot be increased, for example, temperatures which will change the nature of the zeolite or lead to undesirable side reactions.

Catalyst activity will decline over time as severity increases. Factors which affect severity include: hydrogen to oil mole ratio, hydrogen partial pressure, total pressure, temperature, feed rate per volume of catalyst (space velocity), and type of hydrocarbon in the feed.

In the measurement of activity maintenance all variables are fixed and only the catalyst differs. Thus, an activity of one catalyst over a period of time can be directly compared to the activity of another catalyst over the same time period where feed, hydrogen to oil ratios, pressures, etc. are constant.

Catalysts may be evaluated for their activity maintenance by two tests. In the Standard Activity Test (SAT) which is conventionally employed, the catalyst is sieved, mixed with sieved silica and charged into a reactor. The catalyst is then subjected to conditions of 510° C., 700 kPa (gauge), a space velocity of 2.5 w/w/hour and a $H_2$/hydrocarbon mole ratio of 6. The feed consists by weight of 60% n-hexane, 30% methylpentane and 10% methylcyclopentane (MCP). Catalysts are evaluated with respect to their cycle lengths, defined as the number of hours in which a time-averaged benzene yield of 50% by weight is maintained.

A second test of activity maintenance known as the Expedited Catalyst Aging Test (ECAT) has been developed where a total of 0.20 g of catalyst consisting of 20/40 mesh particles is mixed with 0.80 g of $SiO_2$ of 20/40 mesh. The resulting catalyst charge is introduced into a stainless steel downflow reactor of about 1 cm inner diameter equipped with a thermocouple. Before introduction of feed the catalyst is reduced in situ under flowing $H_2$ gas at temperatures no greater than 525° C. After reduction the feed is introduced into the reactor along with $H_2$ gas at a mole ratio of $H_2$:hydrocarbon of 6 and a space velocity of 50 w/w/hour, at a temperature of 510° C. and a pressure of 700 kPa (gauge). The products were analyzed using on-line gas chromatography, although other techniques are available and known in the industry. Catalysts are evaluated with respect to their benzene yield (weight percent) after 24 hours on feed.

The improvement in activity maintenance is manifested by the catalysts of this invention in that they all provide a benzene yield in excess of 7 weight percent after 24 hours on oil in the ECAT test as described above using a feed comprising 20% by volume methylcyclopentane and 80% by volume n-hexane.

The catalyst composition herein prior to reduction thereof contains particles containing noble metal which are well dispersed over the surface of the catalyst. By this expression is meant that the diameter of substantially all the particles in which the noble metal is dispersed is less than 7 Å, as described herein below. By "substantially all" is meant that at least 90%, preferably greater than 98% of the noble metal is dispersed in the form of smaller than 7 Å particles. Initial dispersion of the catalyst is found to correlate directly with its acitvity maintenance when it is subjected to reforming conditions.

The surface of the catalyst over which the particles are dispersed necessarily includes the internal surface of the catalyst, i.e., the channels of the zeiolite, but may also include dispersion over the external surface, which is considerably smaller. The dispersion will be present on those surfaces of the catalyst which are accessible to noble metal loading and dispersion techniques. The most preferred catalyst will contain highly dispersed noble metal atoms, all or substantially all of which are located inside the pores of the catalyst rather than on the exterior surface thereof. Thus at least 75% preferably, at least 90%, of the noble metal will exist inside the channels of the preferred catalyst herein. Further, the noble metal inside the channels must be well dispersed. The location of the particles can be inferred from electron spectroscopy for chemical analysis (ESCA) measurements, which are well known to those skilled in the art.

ESCA measurements made to determine the possible preferential disposition of platinum on the external surface of the catalyst of the present invention showed no substantial platinum accumulation on the external zeolite surfaces of the freshly prepared catalyst or on the catalyst which has been treated by the multi-step technique, as described hereinbelow. However, after the catalyst was deactivated, and after the decoking step which comprised an oxygen burn in the presence of water vapor, appreciable agglomeration of platinum near or at the external zeolite surfaces was detected. This is shown in the following table which gives the intensity ratio of the platinum 4f peak to the silicon 2p peak of the zeolite support in the ESCA analysis, which in turn is an indication of surface platinum-to-silicon ratio in the material being studied.

| ESCA $Pt_{4f}/Si_{2p}$ Intensity Ratio of Potassium-Exchanged Zeolite L Catalyst Ratio of this Invention | |
| --- | --- |
| Fresh Catalyst C of Example 1 (ion exchanged, 350° C. calcined) | 0.038 |
| Deactivated Catalyst C | 0.052 |
| Wet Oxygen Decoked Catalyst C | 0.12 |
| Catalyst of Enhanced Dispersion Prepared by Multi-step Method from Deactivated Catalyst | 0.034 |

These data support the micrograph evidence, showing that in freshly prepared catalysts and catalysts which are treated by the multi-step method, the platinum was not preferentially concentrated near or at the external surface. With deactivated catalyst some preferential transport toward the external surface occurred. In the decoked sample, larger than 20 Å agglomerates on the surface were visible in micrographs, and this is confirmed by the high Pt/Si ratio of the ESCA measurement. Because the ESCA measurement detects primarily the platinum atoms at or close to the surface of the large platinum agglomerates, the ratio is not as high as would be measured if the platinum on the external surface were well dispersed rather than in the form of large agglomerates, as discussed in Fung, S. C., J. Catal., 58, 454 (1979).

The required provision that the particles be well dispersed over the surface of the catalyst implies that there is no preferential disposition of noble metal particles on the external surface. In other words, it signifies that the noble metal is substantially uniformly distributed throughout the internal and external surfaces of the catalysts. This uniform distribution is approached to the extent that the ESCA measurements of the catalyst indicate substantially no preferential disposition of the noble metal on the external surface of the zeolite.

Additionally, the catalyst herein is characterized in that at least about 90% of the noble metal, prior to reduction thereof, is dispersed in the form of particles having a diameter less than about 7 Å. Thus, if, for example, more than 10% of the noble metal is dispersed in the form of particles measured to have diameters of 12-15 Å, or if more than 10% of the noble metal is dispersed in the form of particles measured to have diameters of greater than 15 Å, the catalyst exhibits reduced activity and activity maintenance. As measured by conventional bright field imaging in a transmission electron microscope with 4 Å point-to-point resolution, the particle size in the preferred catalyst of this invention is found to be such that no more than 2% of the noble metal is dispersed in the form of particles measured to be about 7 Å or greater in diameter.

The noble metal atoms may be clustered in any type of configuration, including that in which the atoms are connected to form a raft shape where they exist as a monatomic layer. The size of the particles as described above may be measured using high resolution electron microscopy. In this procedure, described in P. C. Flynn et al., J. Catal., 33, 233-248 (1974), the noble metal loaded zeolite is prepared for the transmission electron microscope (TEM) by crushing in an agate mortar and pestle to produce zeolite fragments through which an electron beam can pass. The crushed powder is ultrasonically dispersed in ethanol and a drop of this suspension is allowed to dry onto a standard 3 mm TEM grid, which is covered with a thin ($\leq$200 Å) amorphous carbon film. Samples are analyzed in a Philips 400T TEM at 100 KV by conventional bright field imaging. Owing to the complexities of the contrast and imaging process involved in the bright field imaging mode, the lowest measurable noble metal particle diameter is 7 Å when the particle is in raft shape, and is 5 Å when the particle is in spheroidal (agglomerated) shape. The actual size may differ by ±2 Å from these measurements. Therefore, noble metal raft particles less than 7 Å in diameter, typical of good dispersion, cannot be detected by the bright field imaging method using the Philips 400T microscope. Thus, degree of dispersion is determined by measuring the quantity of noble metal dispersed in measurable particles of diameter 7 Å or greater. The remainder of the noble metal necessarily exists in the form of particles below 7 Å in diameter.

When different samples are compared under the electron microscope, there is a ±50% uncertainty in the relative thickness of the specimen. Consequently, the estimated percent amount of visible particulates (7 Å and greater if rafts, 5 Å and greater if spheroids) is subject to this same ±50% uncertainty. For example, a catalyst reported as comprising 10% noble metal particles measuring 7 Å in diameter or greater, and 90% below 7 Å in diameter could actually consist of between 5% and 15% of visible particles measuring 7 Å or greater in diameter and between 95 and 85% of highly dispersed clusters below 7 Å in diameter.

Samples of fresh catalysts may also be examined using Z-contrast imaging. In this method samples are prepared exactly as for bright field imagining, but are examined using a high resolution scanning transmission electron microscope (STEM). In this instrument samples are examined by a finely focused electron beam about 5 Å in diameter, which is scanned across the sample. Signals collected by the various detectors positioned around the sample can be displayed on a synchronously scanned TV monitor to build up the image. Images formed by taking the ratio of the annular detector signal and the transmitted electron image-loss signal show contrast which is sensitive to variations of atomic number Z within the sample. Pt has atomic number Z equal to 78 whereas zeolite L comprises only low Z atoms, K, Si, Al, O, H (Z=19, 14, 13, 8 and 1, respectively). Thus, Z-contrast imaging provides a sensitive method of detecting very small Pt clusters when supported on the zeolite L.

Figure 10:
FIG. 10 represents an electron micrograph which is a Z contrast image of a thin edge of a catalyst of this invention.

FIG. 10 represents an electron micrograph which is a Z-contrast image of a thin edge of a catalyst of this invention. On the micrograph, some of the visible small clusters of platinum, probably 3 atoms or less, are indicated by arrows. Other articles, some larger in size, are also visible. Also visible is the 16 Å spacing of the channels of the zeolite substrate. The metric scale on this diagram (horizontal line) corresponds to 50 Å. This Z-contrast image shows that the more highly active fresh catalyst contains many Pt clusters smaller than 5 Å, comprising 5 atoms or fewer. In contrast, a deactivated catalyst comprises mostly 12 to 15 Å Pt agglomerates and few clusters containing less than 5 atoms. Catalysts which are regenerated and dispersed also show a fine Pt dispersion with many clusters containing 5 atoms or fewer.

An additional method of probing the extent of dispersion and chemical state of the noble metal particles is EXAFS (extended x-ray absorption fine structure). EXAFS is an element-specific electron scattering technique in which a core electron ejected by an x-ray photon probes the local environment of the absorbing atom. The ejected photoelectron is back scattered by the neighboring atoms of the absorbing species and interferes constructively or destructively with the outgoing electron wave, depending on the energy of the photoelectron. The energy of the photoelectron is equal to the difference between the x-ray photon energy and a threshold energy associated with ejection of the electron. If the EXAFS experiment the photoelectron energy is varied by varying the energy of the incident x-ray beam. The interference between outgoing and backscattered electron waves as a function of energy modulates the x-ray absorption coefficient so that the EXAFS function $\kappa \cdot \chi(K)$ is observed experimentally as oscillations in the absorption coefficient $\mu$ on the high energy side of the absorption edges.

Figure 11:
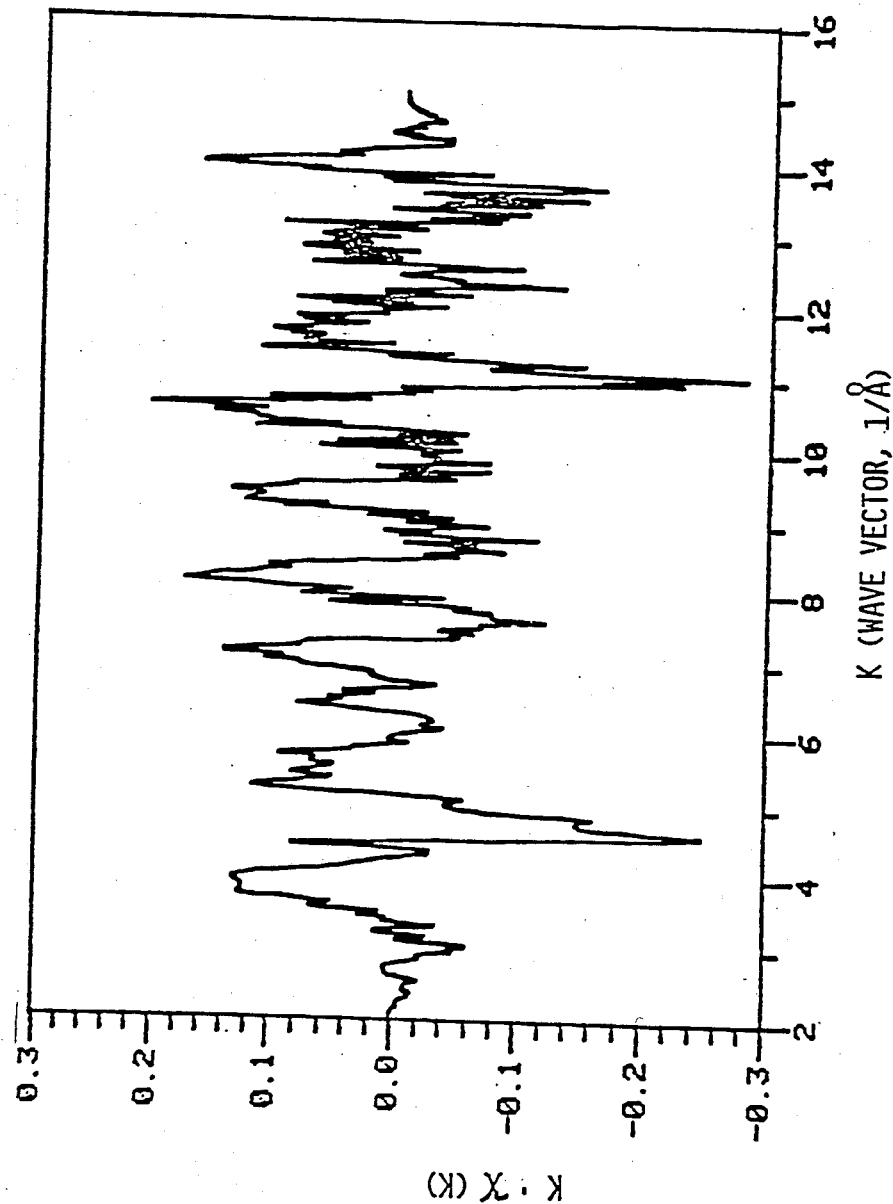
FIG. 11 represents an EXAFS pattern for a potassium-exchanged zeolite L catalyst of this invention.

For the EXAFS experiments, samples of various catalysts were dried, calcined and subsequently reduced in situ at between 400° and 500° C. The EXAFS measurements were made in flowing hydrogen at about −170° C. FIG. 11 shows the EXAFS pattern for a platinum on potassium-exchanged zeolite L catalyst similar to catalyst C of Example 1. The following table gives the nearest neighbor coordination number and interatomic distances calculated from the EXAFS data for various samples. Comparison of potassium-exchanged zeolite L with 1% Pt on $SiO_2$ (sintered to be representative of bulk platinum metal) shows that the Pt-Pt distance remains substantially unchanged from that in bulk metal whereas the Pt-Pt coordination is reduced from the bulk value of 12 nearest neighbors to approximately 5. This value of 5 is consistent with a catalyst in which the Pt is highly dispersed. For example, 1% $Pt/Al_2O_3$ as described in Via et al., *J. Chem. Phys.*, 71, 690 (1979) has a coordination number of about 7 and gives a hydrogen to metal atom ratio of about 1 in a standard chemisorption test. These results indicate that essentially all of the metal atoms are surface atoms.

The EXAFS data for catalyst H of Example 1 which was deactivated on oil and regenerated via wet coke burn, oxychlorination and wet post treatment, is qualitatively the same as that obtained for the fresh reduced catalyst described above and is thus consistent with a high degree of metal dispersion.

| EXAFS Properties of Supported Pt Catalysts | | |
|---|---|---|
| Catalyst | $N_1$ | $R_1$ (Å) |
| 1% $Pt/SiO_2$, sintered | 12 | 2.775 |
| 0.6% Pt/ potassium-exchanged zeolite L | 5 ± 1.5 | 2.766 |
| 1% $Pt/Al_2O_3$ | 7 ± 1.5 | 2.758 |

Note:
$N_1$ is equal to average nearest neighbor Pt—Pt coordination number.
$R_1$ is equal to average nearest neighbor Pt—Pt interatomic distance.

As an additional characteristic, if the catalyst is loaded with the noble metal by, for example, an ion-exchange technique, it is desirable that the type L zeolite chosen as the support have, prior to being loaded with the noble metal, a pH between 9 and 11.5 as determined by the following method: A 2.5 g sample of zeolite is equilibrated at ambient temperature with 70 cc of distilled water and the pH of the slurry is determined. The pH should be higher than about 9.3, preferably 10 to 11. If the pH of the zeolite is not within the above range, we believe that traditional impregnation or ion exchange methods will not yield a catalyst which has highly dispersed noble metal particles within a preferred size range. While not limited to any one theory, the belief is that the pH of the zeolite characterizes a surface state of the zeolite and controls the affinity of the zeolite for the noble metal during ion exchange or impregnation.

Another feature of the catalyst herein which identifies those catalysts having the improved selectivity and activity maintenance as defined herein is its terminal cracking index (TCI). This index is defined as the molar ratio of pentanes to butanes produced when the catalyst is evaluated by the ECAT procedure described above using 100% n-hexane feed. The index measures the degree to which terminal cracking is promoted as opposed to internal cracking for a given catalyst. The higher this index the more selective the catalyst herein toward aromatization products because increased terminal cracking relative to internal carbon cracking of the hydrocarbon chain as measured by reforming n-hexane indicates that terminal adsorption of the substrate onto the noble metal occurs preferentially, as opposed to internal adsorption, thus favoring, for example, 1-6-closures for aromatization and terminal cracking of the hexane feed.

This index shows not only that to perform well the preferred catalyst herein must not be acidic, but also that the noble metal is not to any significant extent on the exterior surface of the catalyst, but rather is inside the channels of the catalyst and adsorbs the terminal carbon atom of straight-chain paraffins. For purposes herein, the terminal cracking index of the catalysts of this invention is greater than about 1.5, preferably greater than about 1.7.

FIG. 1 illustrates the relationship between the selectivity parameter (defined as the weight ratio of benzene product to the sum of total benzene plus $C_2$–$C_5$ produced) and the terminal cracking index (TCI) for zeolite L loaded with 0.6% Pt. The relationship shows a clear correlation, indicating that the terminal cracking index does accurately identify the selective reforming catalysts when a type L zeolite is employed as the catalyst base. FIG. 1 also illustrates that a conventional active 0.6% Pt on silica catalyst has a much lower terminal cracking index which does not exceed 1.0. Such a value is typical of random cracking of a hexane molecule.

The TCI of a given catalyst varies with the type of feed and the severity of the conversion. Generally, as the result of secondary cracking reactions, the TCI for catalysts which have a TCI above one under ECAT conditions described above will decrease as the conversion is increased, as indicated in the following Table I. These results show that ECAT is a better test for determining the TCI than the SAT test because the TCI is not meaningful at the high conversion levels encountered under SAT test conditions.

These results show that the zeolite of this invention which has a high TCI also has a high benzene yield. Experiments have shown, however, that the correlation between TCI and benzene yield cannot be made when the reforming catalyst is much less catalytically active than the catalysts listed in Table II above such as, e.g., platinum supported on KOH-treated (K-treated) silica/alumina.

It has also been determined that the terminal cracking index of a given catalyst remains reasonably constant over the course of the operation after an initial period of equilibration, as indicated in Table III for various catalysts consisting of 0.6% Pt on zeolite L.

These catalysts were prepared as follows: Catalyst I was prepared in accordance with the teachings of U.S. Pat. No. 4,104,320. Catalyst II was prepared by ion-exchange of platinum on a zeolite similar to that used as a base for catalyst C in Example 1 where the catalyst is calcined at 550° C. Catalysts III and IV were prepared by enhanced dispersion of catalysts similar to Catalyst II, using the multi-step technique described hereinbelow.

TABLE III

| Time on Oil (hours) | Terminal Cracking Index (TCI) Catalyst | | | |
|---|---|---|---|---|
| | I | II | III | IV |
| 1 | — | 1.81 | — | 1.99 |
| 2–3 | 1.54 | — | 1.60 | — |
| 5–6 | — | 1.90 | 1.71 | 2.10 |
| 13–15 | 1.43 | 1.90 | 1.96 | 2.22 |
| 20–25 | 1.46 | 1.90 | 1.98 | 2.27 |
| 30–35 | 1.46 | 1.85 | 2.08 | 2.25 |
| 40–45 | 1.39 | 1.89 | 1.96 | 2.29 |
| 50–55 | 1.30 | 1.84 | 1.97 | 2.31 |
| 55–65 | 1.25 | 1.82 | 1.93 | 2.29 |

Catalysts based on type L zeolite which have the requisite noble metal particle size and dispersion as

TABLE I

| 0.6 wt. % Pt on Zeolite L Catalyst Loaded by Ion Exchange | | | | After 1–3 Hours on Oil | | |
|---|---|---|---|---|---|---|
| Temperature (°C.) | Pressure (kPa) | Space Velocity (w/w/hr) | H₂/Hydrocarbon (mole:mole) | Benzene Yield (wt. %) | Conversion (wt. %) | TCI |
| 510 | 700 | 50 | 6.0 | 25.1 | 31.7 | 1.57[1] |
| 510 | 700 | 2.33 | 6.4 | 49.0 | 97.5 | 0.82[2] |

[1]This run was made using 100% n-hexane feed.
[2]This run was made using a feed of 60% n-hexane, 30% methylpentane and 10% methylcyclopentane. The latter two feed constituents are known to raise the TCI of the catalyst above what it would be using 100% n-hexane feed.

The TCI also varies with the type of catalyst employed, as indicated in Table II.

TABLE II

| Catalyst | wt. % Pt | Benzene Yield At 1–3 Hours (wt. %) | TCI |
|---|---|---|---|
| Pt on NaX Zeolite | 1.0 | 30 | 0.9 |
| Pt on Na/K X Zeolites | 0.6 | 19.6 | 1.2–1.3 |
| Pt on K-treated SiO₂/Al₂O₃ | 0.73 | 4.1 | 0.8 |
| Pt on SiO₂ | 1.1 | 15.1 | 0.9 |
| Pt on SiO₂ | 0.74 | 10 | 0.9 |
| Pt on Potassium-exchanged Zeolite L Catalyst of U.S. Pat. No. 4,104,320 | 0.6 | 21.1 | 1.3–1.4 |
| Pt on Potassium-Exchanged Zeolite L Catalyst of this Invention | 1.0 | 56.9 | 1.5–2.5 | described above will have the requisite terminal cracking index.

The catalysts of this invention also exhibit substantial monofunctionality. Many known reforming catalysts exhibit bifunctionality in that not only do the noble metal atoms participate in the catalytic reaction, but also the acidic sites of the catalyst support. For example, a conventional catalyst consisting of Pt-Re metals on alumina aromatizes hexane through both the metal sites and the acid sites of the alumina support. It contrast, the catalyst herein behaves essentially monofunctionally in that the catalytic reactions predominantly occur on the noble metal sites of the catalyst, with only a small amount of catalysis occurring on the acidic sites initially produced when the catalyst is first reduced.

Several methods exist for preparing the reforming catalysts of this invention, which depend mainly on the particular zeolite being utilized as the support.

If the zeolite has the proper pH as described above it may be loaded with the noble metal in the appropriate amount (i.e., effective amount) by the methods described above such as, e.g., impregnation or ion exchange with the ions of the zeolite support, and most preferably ion exchange. Platinum, for example, can be introduced on the support by methods described in the literature such as by impregnation with an aqueous solution of a salt or of a platinum complex such as chloroplatinous acid, hexachloroplatinic acid, dinitrodiaminoplatinum or platinum tetraamine dichloride. In addition, it may be introduced in a preferred embodiment by ion exchange with an aqueous solution of a platinum cationic complex such as platinum tetraamine dichloride. Similar compounds can be used to supply the other Group VIII noble metals such as iridium or rhenium. If more than one metal is to be introduced into the catalyst, solutions containing salts of each metal may be introduced simultaneously or sequentially. It is noted, however, that there is an inverse relationship between the average size of the zeolite crystallite and the maximal or optimal amount of noble metal loaded. Thus, for example, as the average zeolite crystal size increases from, e.g., 0.1 to 1 micron, the maximum effective amount of Pt loading will decrease from, e.g., about 6% to about 2.0% by weight.

After the loading step is complete, the resulting catalyst precursor is recovered and preferably calcined in air, preferably at a temperature of between about 250° and 480° C. for 1 to 6 hours. For use in reforming; the calcined catalyst is reduced in hydrogen. The resultant product will have the requisite minimum terminal cracking index for use in this invention.

Another method for preparing catalysts derived from type L zeolites which have the requisite terminal cracking index and highly dispersed Group VIII noble metals as defined herein involves immersing the type L zeolite which has been dry-heated at an elevated temperature as described below immediately into a concentrated solution of a Group VIII noble metal salt or complex. This method is particularly applicable to type L zeolites which have an average crystallite size of no greater than about 0.2, preferably 0.1, micron so as to improve the dispersibility of the noble metal therein. However, this method may also be used for type L zeolites having larger average crystallite sizes up to about 0.5 micron or greater if so desired.

In this method the zeolite is heated to a temperature of from about 70° to 200° C. and immediately contacted with a solution, preferably an aqueous solution, containing from about 7 to 20 mg equivalent noble metal per cc of solution, preferably 10 to 15 mg per cc. One example of a source of the Group VIII noble metal is $Pt(NH_3)_4Cl_2$. The amount of time necessary for this metal loading step will depend on the drying temperature employed, but is typically measured in less than 60 seconds. If the preferred temperature range of 100° to 150° C. is employed, however, the typical time required for immersion in the solution is from 2 to 10 seconds, preferably 2.5 to 5 seconds. During the immersion the noble metal loading occurs via a combination of pore-filling and ion exchange.

After the contacting step is complete, the noble metal loaded type L zeolite is withdrawn from the solution and dried, preferably in an oven at a temperature of from about 80° to 200° C., preferably 100° to 150° C., for about 2 to 20 hours and reduced in hydrogen. A calcining step may precede the hydrogen reduction step.

In another method for preparing catalysts derived from type L zeolites as described herein which is the most preferred method, the dispersion of a freshly prepared catalyst (i.e., one not run on hydrocarbons) or a deactivated catalyst is enhanced by a sequential multistep gas treating technique described below. This technique results in very finely dispersed noble metals leading to catalysts having excellent activity maintenance. In each of the steps described below the remaining percentage of the gaseous stream which is not water, hydrogen, oxygen or a source of chlorine is generally an inert gas, such as nitrogen, helium or argon, which will not interfere with this process. Preferably water is present in the gaseous stream of each step.

In the first step of this enhanced dispersion method the catalyst is heated in the presence of a gaseous stream containing from 0 to 10% by volume water, preferably 0.5 to 5% by volume, more preferably 1–3%, based on the total stream volume, and oxygen (usually in the form of an oxygen-containing gas such as air), hydrogen or an inert gas at a temperature of about 380° to 540° C., depending on the catalyst employed. For purposes herein the inert gas is defined as a gas which does not react with the catalyst and is the carrier for the other gases such as oxygen or hydrogen used in other steps. Examples of inert gases include helium, argon and nitrogen. Preferably, if oxygen is employed and the catalyst being treated is deactivated, this first step is carried out at two temperatures, the first being at a lower range of about 380°–480° C. and the second being at a higher range of about 480°–520° C. The $O_2$ treatment at the lower temperature is preferably carried out for a longer time than the second $O_2$ treatment. The exact time for heating will depend on the temperature employed, but generally will range up to 10 hours, preferably 2 to 8 hours. The amount of oxygen employed is generally from 0.1 to 25% by volume, preferably 0.2 to 15% by volume, more preferably 0.5 to 12% of the gas stream. If hydrogen is employed the amount is 1 to 25% by volume, preferably 2–20%. If an inert gas is employed, it may constitute up to 100% by volume of the gaseous stream.

The second step of this specific method can proceed in one of four manners:

(i) the catalyst is oxychlorinated (dispersion of the noble metal) by heating at a temperature of from about 400° to 530° C., preferably 480°–520° C., for up to 10 hours, preferably 1 to 3 hours, in the presence of a gaseous stream comprising from 0 to 10% by volume water, preferably 0.5 to 5%, more preferably 1 to 3%, a source of chlorine such as, e.g. $Cl_2$, HCl, chloroform, methyl chloride, carbon tetrachloride, 1,2-dichloroethane, trichloroethane, or mixtures thereof, and the like, in an amount of about 0.005 to B 10 volume percent, preferably 0.05 to 4%, more preferably 0.05 to 1%, and most preferably 0.05 to 0.5%, and in the presence of oxygen in an amount of 0.1 to 25% by volume, preferably 0.2 to 15%, more preferably 0.5 to 12%.

(ii) the catalyst is chlorinated by proceeding as in (i), except that hydrogen is used in place of oxygen. However, when HCl is the source of chlorine, hydrogen is not required. When proceeding in this manner, oxychlorination will occur in the third step discussed hereinbelow.

(iii) Steps (ii) and (i) can be combined, in that order.

The preferred chlorine sources in these steps are HCl and $Cl_2$.

(iv) The catalyst is chlorinated by heating at a temperature from about 400° to 530°, preferably 480° to 520° C., for up to 10 hours preferably for 1 to 3 hours in the presence of a gaseous stream comprising from 0 to 10% by volume of water preferably 0.5 to 5% and more preferably 1 to 3% and 0.005 to 10% chlorine more preferably 0.05 to 1% and most preferably 0.05 to 0.5%.

In addition, if the catalyst is deactivated and hydrogen or an inert gas is employed in the first step, oxygen must be present in the gaseous stream of the second step, i.e., this second step must be an oxychlorination step to ensure coke removal.

In the third step of this enhanced dispersion method (oxygen post-treat step), the catalyst is contacted with an oxygen-containing gaseous stream (where the amount of oxygen in the stream is generally 0.1 to 25% by volume, preferably 0.2 to 15% by volume, more preferably 0.5 to 12%) at a temperature of 400° to 540° C. for up to 7 hours if essentially no water is employed or for up to 5 hours in the presence of from greater than 0 to 10 volume percent water. Preferably this step is carried out from 480° to 520° C. in the presence of 0.5 to 5% by volume water for 0.5 to 3 hours and more preferably in the presence of 1 to 3 volume % water for 0.5 to 1.5 hours. If no water is present preferably the step is carried out for 0.5 to 6 hours and more preferably for 1 to 5 hours.

In a fourth and final step (hydrogen reduction step), the catalyst is heated in the presence of a hydrogen-containing gaseous stream (where the amount of hydrogen in the stream is generally 1 to 25% by volume, preferably 2 to 20%) in the presence of from 0 to 10% by volume water at a temperature of from about 400° to 530° C. for up to 10 hours. Preferably this final step is carried out at a temperature of 400° to 520° C. in the presence of 0.5 to 5% by volume water for 1 to 6 hours.

In all steps, reactor pressure is generally from 0.1 to 2 MPa. Preferably the gas flow rates for each step in the above process range from about 1 to 300 cc/g of catalyst per minute. If no oxychlorination step is employed preferably the gas flow rate of the oxygen post-treat step is below 20 cc/g catalyst/min. and preferably below 10 cc/g catalyst/min. Optionally, the second step can consist of a chlorination step followed by an oxychlorination step as described hereinabove.

The catalysts with enhanced dispersion produced by this process exhibit improved noble metal dispersion, activity maintenance and terminal cracking index over catalysts which are not treated by this method before use as reforming catalyst.

Without being limited to any one theory, it is believed that the selectivity and activity of the catalyst are greatly influenced by the manner in which the reactant molecules are adsorbed at the active site of the catalyst. This theory is hereinafter called "molecular die" catalysis.

If the hexane is adsorbed terminally (through the $C_1$ atoms), subsequent reaction preferably leads to aromatization. Another reaction occurring to a lesser extent is terminal cracking of adsorbed hexane. If initial adsorption is through a non-terminal carbon atom, no such aromatization can occur because end carbon activation is required for 1-6 carbon ring closure. While terminal cracking also leads to methane production, the aromatization reaction occurs to a greater extent. The adsorption pattern may be influenced by the three-dimensional structure of the catalyst, which may columnate the reactant molecules. Furthermore, the interior structures of and spacial factors within the catalyst may affect favorably post-adsorption reactions as by, e.g., stabilizing or destabilizing the transition states so as to favor cyclization of adsorbed molecular species.

The channel structure of the zeolites give rise to these molecular die effects, i.e., the zeolite one-dimensional channel structure orients the hexane molecules parallel to the axis of the channels. This orientation facilitates terminal adsorption onto the noble metal particles leading to the observed increased activity and selectivity for aromatization.

The reforming process hereing is not limited to conventional reforming of naphthas derived from petroleum or other sources of hydrocarbons and boiling in the range of about 71° to 216° C., but may also be employed to produce the corresponding aromatic products from any reactant organic compound containing at least six carbon atoms, including those which contain reactant functional groups. Examples of reactant compounds suitable for this purpose include paraffins such as n-hexane, n-heptane, n-octane, n-nonane, etc., preferably naphtha boiling in the fraction between 71° and 216° C. Preferred reactions herein are aromatization of n-hexane to benzene, n-heptane to toluene, and n-octane to ethylbenzene and/or xylenes. n-Hexane may be present in the feed or produced by isomerization of methylpentanes and methylcyclopentane. Since the catalyst is monofunctional and does not promote isomerization without cyclization, feed compounds such as dimethylbutanes are not effective.

Additional reactions where the reforming catalyst may be employed advantageously include benzene production from streams such as light naphtha, i.e., a naphtha boiling between about 30° and 100° C., high octane gasoline production from naphtha or light virgin naphtha where the endpoint is between $C_7$ and $C_{12}$ inclusive.

The reforming process described above are carried out under general reforming conditions in the presence of hydrogen at a moderate pressure to favor the aromatization reaction thermodynamically. For traditional reforming of paraffins to aromatics, the temperature depends on the particular paraffin, but for acceptable rate and selectivity preferably ranges from about 400° to 550° C., more preferably from about 450° to 520° C. at pressures of about 200 KPa to 5 MPa, more preferably about 500 KPa to 4 MPa. If the temperature is much below about 400° C. the yield of product is quite low, and if the temperature substantially exceeds about 550° C., other reactions occur which also diminish the yield of product. The liquid hourly space velocity of this reforming reaction is preferably from about 0.5 to 20 w/w/hour, more preferably from 1 to 10 w/w/hour, and the $H_2$/reactant mole ratio is preferably from about 2 to 20, more preferably from about 4 to 10.

The dehydrocyclization reaction is generally carried out by injecting a feedstock charge in the presence of hydrogen gas into a reactor containing the catalyst.

To minimize any hydrocracking reactions which tend to prevail at the beginning of the reaction, it may be desirable to introduce a small amount (less than 0.1% by weight) of sulfur to the catalyst.

For improvement in resistance of the catalyst to temperature, pressure and attrition, the catalyst herein contains a binder material and is formed into shapes before it is subjected to reforming conditions. Platinum may be deposited on the zeolite powder before the addition of the binder and the pellet-forming steps, or may be deposited on the formed tablets, pellets or extrudates. Any conventional binder which is substantially inert under the conditions in which the catalyst is to be employed may be utilized. Suitable binders are derived from kaolin, boehmitic alumina and silica. In preparing the bound catalyst, the freshly prepared catalyst is generally mixed with water and an effective amount (e.g., about 1 to 20% by weight) of the binder precursor until the mixture is homogeneous. The mixture is then heated to about 120° C. to remove water and sieved if necessary. The mixture is then formed into tablets, pellets or extrudates and finally heated at from 450° to 600° C., preferably about 500° C.

During this procedure transport of the noble metal onto the binder may occur and if so will have a deleterious effect on catalytic properties. Therefore, to obtain the highly dispersed noble metal catalyst of this invention it is preferred to treat the formed catalyst using the dispersion steps described hereinbefore.

In the following examples, which are not limiting in any respect, the parts and percentages are by weight for solids and liquids and by volume for gas compositions, unless otherwise noted, and the temperatures are in degrees Celsius.

EXAMPLE 1

Comparison of Various Pt-loaded K-exchange Zeolite L Catalysts

A series of eight catalysts A–H were prepared. Catalyst A containing 0.6% Pt was prepared by ion exchange loading of a zeolite L obtained according to the method described in U.S. Pat. No. 3,216,789. Catalyst B containing 1% Pt was prepared according to the method described in U.S. Pat. No. 4,104,310 to Bernard et al. Catalyst C containing 0.6% Pt was based on a zeolite L having a composition expressed in moles of pure oxides of:

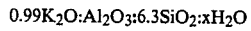

$0.99K_2O:Al_2O_3:6.3SiO_2:xH_2O$ and having a cylindrical shape and an average particle size of about 2 to 2.5 micron. This zeolite L was prepared by the technique described in Example 1 of U.K. Patent Application No. 82-14147 filed May 14, 1982 to Wortel, entitled "Improved Zeolite L". Thus, and alkaline synthesis gel was prepared by dissolving 23.40 g of aluminum hydroxide by boiling in an aqueous solution of 51.23 g of potassium hydroxide pellets (86% pure KOH) in 100.2 g of water to form solution A. After dissolution any water loss was corrected. A separate solution, solution B, was prepared by diluting 225 g of colloidal silica (Ludox HS 40) with 195.0 g of water.

Solutions A and B were mixed for two minutes to form a gel, and just before the gel became fully stiff 224 g thereof was transferred to a Teflon-lined autoclave, preheated to 150° C., and held at the temperature for 72 hours to bring about crystallization.

Figure 2:
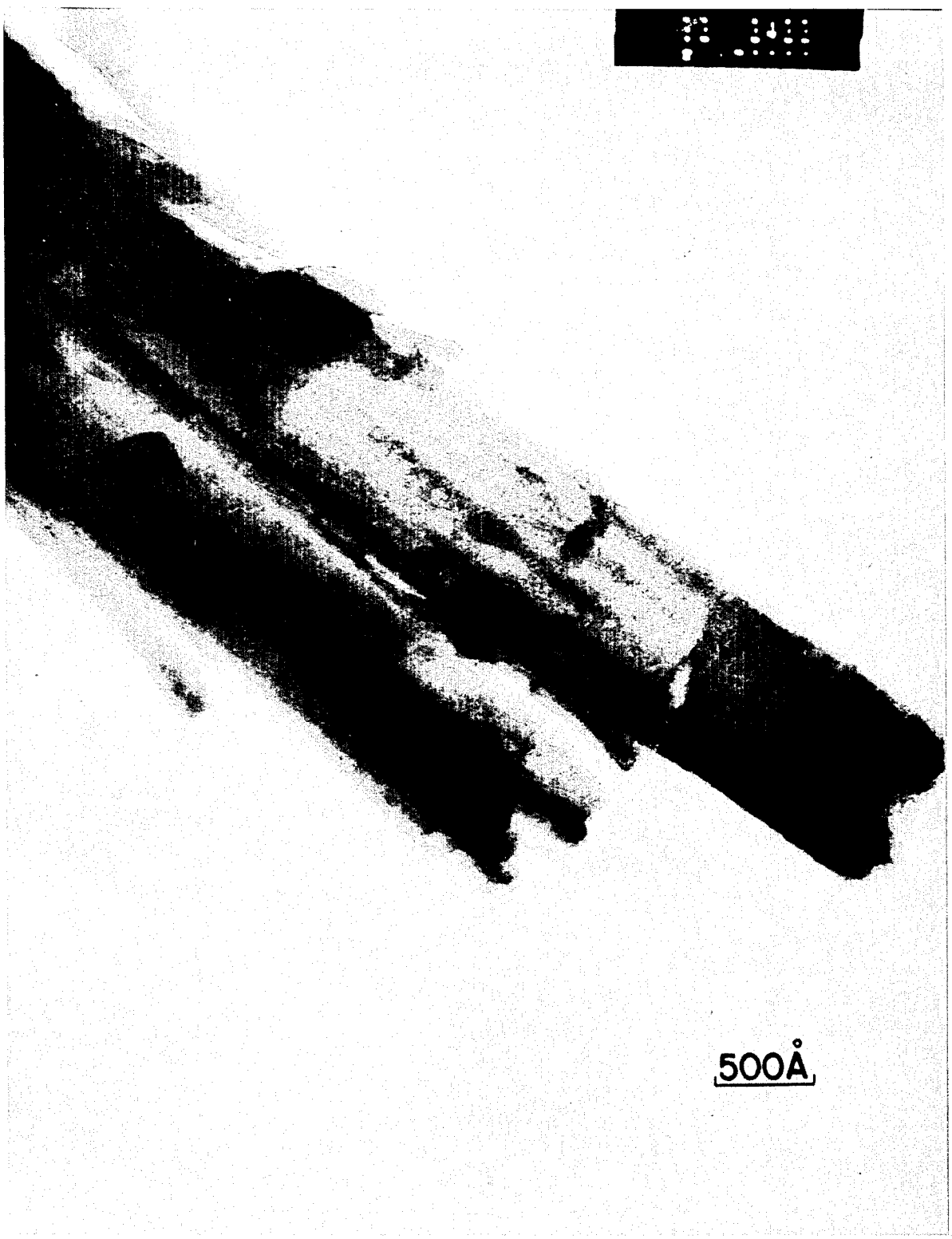
FIG. 2 represents an electron micrograph of a catalyst within the scope of this invention which was calcined but not reduced in hydrogen, where the metric scale is indicated on the micrograph.

The separated zeolite was slurried in water and $Pt(NH_3)_4Cl_2$ solution was added over about a 2 hour period. Following the addition of the Pt source stirring was continued overnight. The mixture was then filtered and the loaded potassium-exchanged zeolite L was dried, tableted, crushed, screened to 20/40 mesh and calcined. FIG. 2, which is the electron micrograph of Catalyst C, indicates that 10% of the Pt is dispersed in the form of particles having a diameter measured to be about 7 Å and 90% having a diameter less than 7 Å. This catalyst had a terminal cracking index of 1.72.

Figure 3:
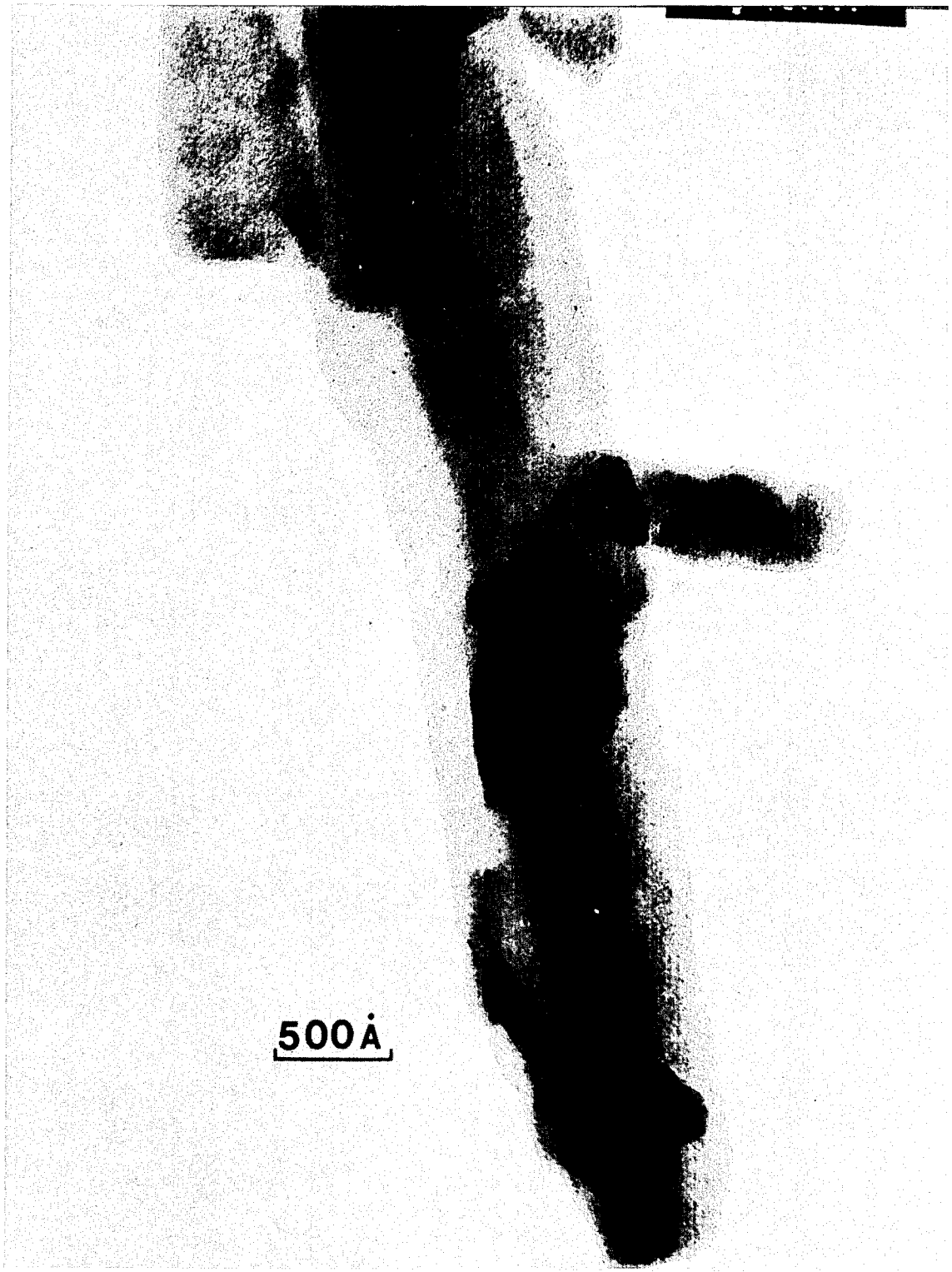
FIG. 3 represents an electron micrograph of the catalyst shown in FIG. 2 which was reduced in hydrogen for one hour, where the scale is indicated on the micrograph.

When this catalyst was reduced in hydrogen some agglomeration of the Pt occurred, as indicated by the electron micrograph in FIG. 3, but the Pt was still quite well dispersed. Thus, 20% of the Pt was dispersed in the form of particles having a diameter measured to be about 8 Å and 80% having a diameter less than about 7 Å.

Catalyst D containing 0.6% Pt was prepared by repeating the preparation procedure for Catalyst C where the zeolite was prepared in a 2-liter autoclave with a 10.2 cm diameter using amounts of reactants increased to give a total synthesis gel weight of 1709 g. A heating-up period of 9 hours was employed to bring the gel to the crystallization temperatures of 150° C. so that a maximum temperature difference of 10° C. was obtained in the gel. A total of 260 g of the zeolite was obtained with cylindrical particles having a size of between 1 and 1.5 micron. The zeolite was loaded with Pt as described for Catalyst C.

Figure 4:
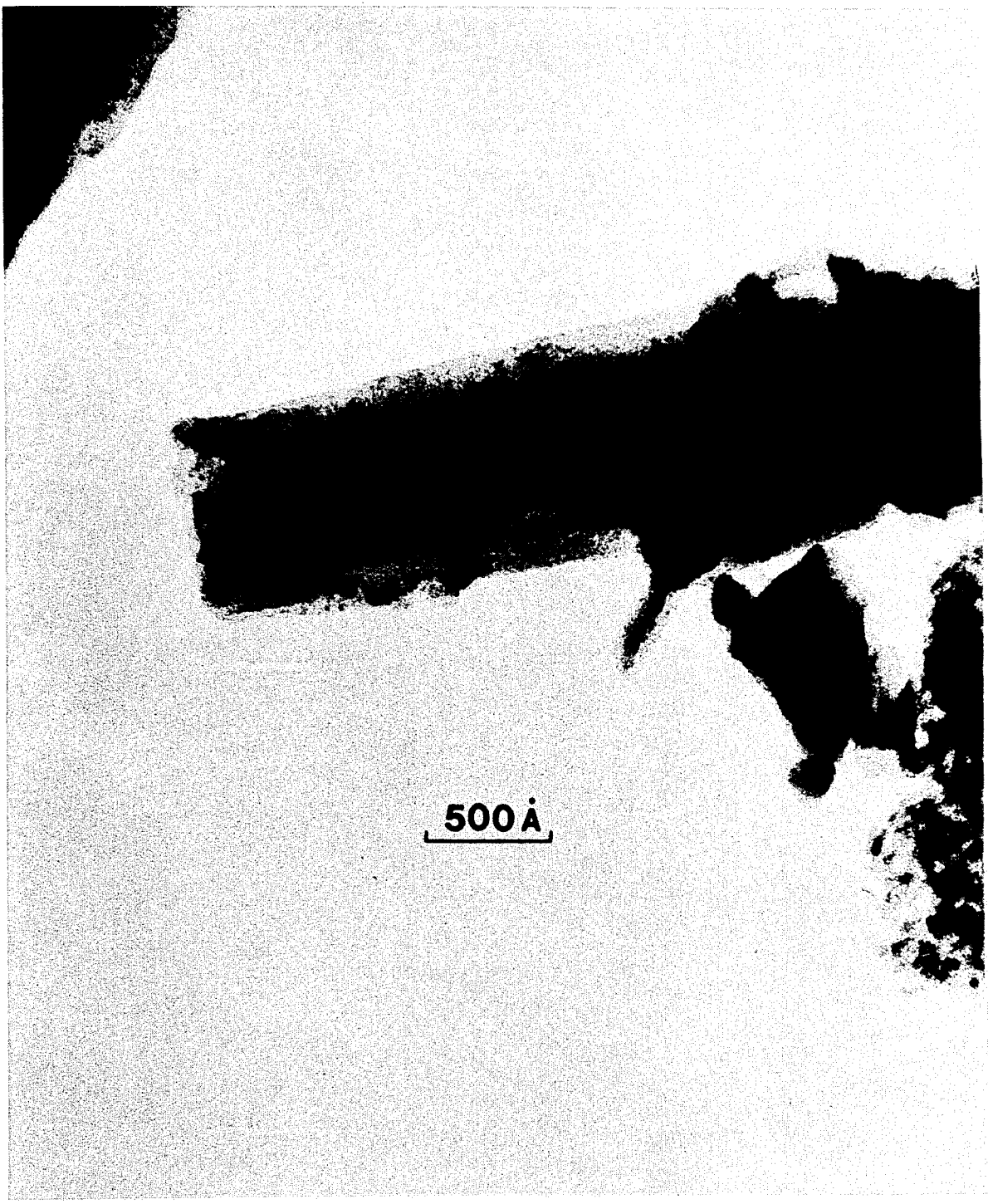
FIG. 4 represents an electron micrograph of another catalyst which was calcined but not reduced in hydrogen, where the scale is indicated on the micrograph.

FIG. 4, which is an electron micrograph of Catalyst D, shows that the catalyst had 90% of its Pt dispersed in the form of particles having a diameter of less than 7 Å and 10% measured to have a diameter of 7 Å or greater. Few particles could be detected from the micrographs, indicating high dispersion.

Figure 5:
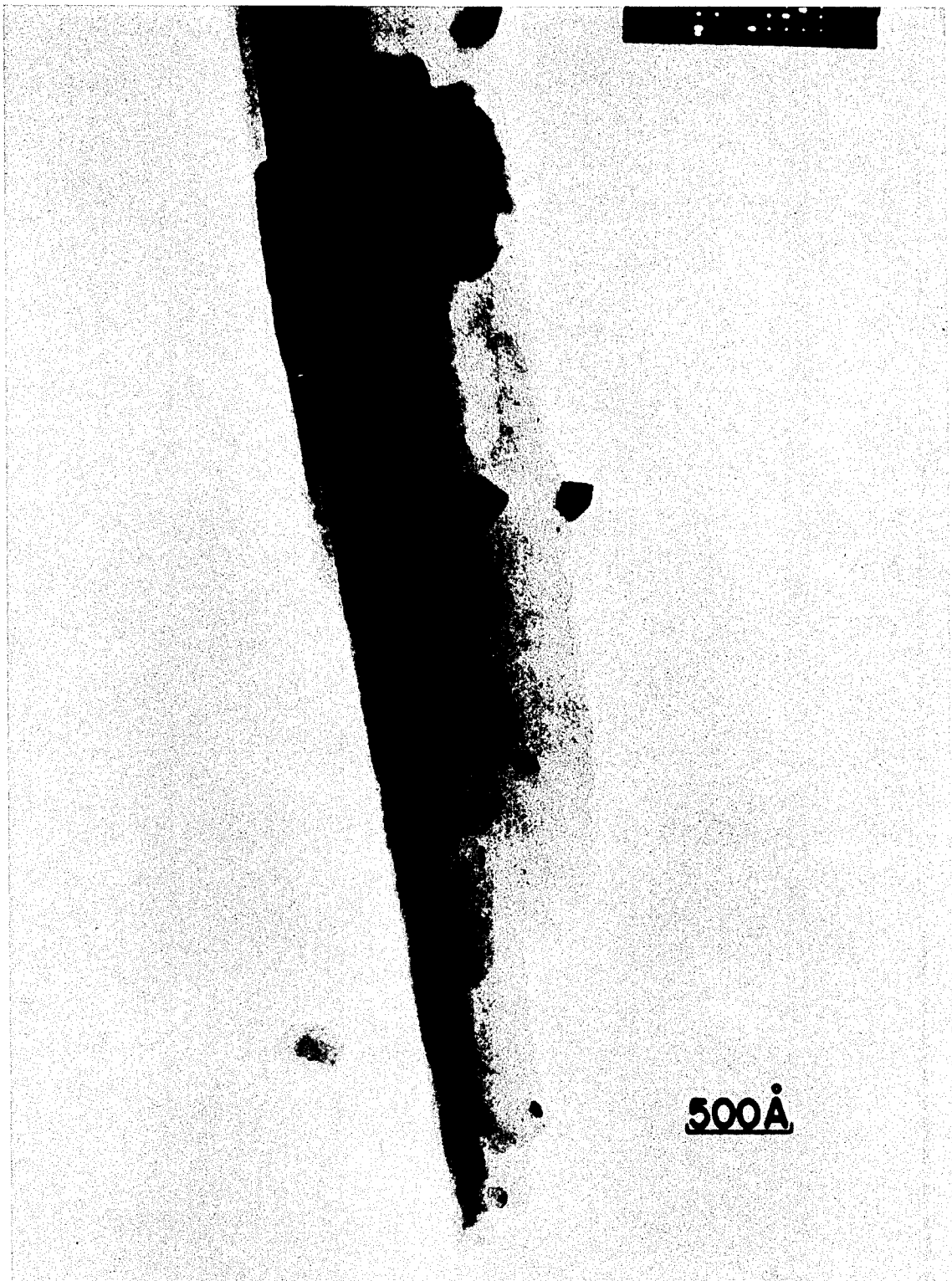
FIG. 5 represents an electron micrograph of a catalyst which is not highly dispersed and thus is outside the scope of the invention and which was calcined but not reduced in hydrogen, where the scale is indicated on the micrograph.

Catalyst E containing 0.6% Pt was prepared by repeating the preparation procedure for Catalyst D but using a heating-up period consisting of rapid heating to 100° C., holding at 100° C. for 24 hours, rapid heating to 200° C. and allowing the zeolite to crystallize. FIG. 5, representing the electron micrograph of the material, shows that 70% of the Pt is dispersed in the form of particles having a diameter measured to be 100 Å, 5% having a diameter measured to be 10 Å and 25% having a diameter less than about 7 Å.

Catalyst F containing 0.6% Pt and Catalyst G containing 1% Pt were prepared by similar techniques as described for preparing Catalyst C.

Catalyst H was prepared by deactivating, regenerating and redispersing Catalyst C. Catalyst C was deactivated in a reactor during a light naphtha aromatization run using a feed of 60% n-hexane, 30% isohexane and 10% methylcyclopentane, run at 510° C. at 700 kPa (gauge) at a space velocity of 2.5 w/w/hour and at a hydrogen to hydrocarbon ratio of 6 for about 350 hours. At the end of the run the catalyst contained 2.18% coke by weight and 90% of the platinum was agglomerated in the form of particles measured to be about 12 Å in diameter and 10% of the platinum was in particles having a diameter of less than 7 Å.

A total of 6.2 g of this deactivated catalyst was charged in a reactor and contacted with a series of gas compositions as described below flowing at a rate of 200 cc/min. for the given period of time. The remaining percentage of the gas compositions consisted of He gas.

| Step | Temp. (°C.) | Gas Composition (%) | Duration (hrs.) | Electron Microscopy Measurement After Step |
|---|---|---|---|---|
| Wet Coke Burn | 480 | 2% $O_2$, 2% $H_2O$ | 2.5 | — |
| Wet Coke Burn | 510 | 9% $O_2$, 2% $H_2O$ | 1.5 | >90% 50 Å < Pt <150 Å |
| Wet | 510 | 9.7% $O_2$, 0.2% | 2.5 | >90% of |

-continued

| Step | Temp. (°C.) | Gas Composition (%) | Duration (hrs.) | Electron Microscopy Measurement After Step |
|---|---|---|---|---|
| Oxy-chlor-ination | | HCl, 2% $H_2O$ | | Pt < 7 Å |
| Wet $O_2$ Post-Treat | 510 | 9.3% $O_2$, 2% $H_2O$ | 1.0 | >99% of Pt <7 Å |
| Wet $H_2$ Reduction | 510 | 20% $H_2$, 2% $H_2O$ | 1.4 | >99% of Pt <7 Å |

Figure 6:
FIG. 6 represents an electron micrograph of the catalyst of FIG. 2 after deactivation and regeneration and dispersion by a multi-step technique involving a preferred oxychlorination step, where the scale is indicated on the micrograph.

FIG. 6, representing the micrograph of Catalyst H, revealed that greater than 99% of the Pt is dispersed in the form of particles having a diameter of less than 7 Å, and less than 1% measured to be 7 Å or greater. A Micrograph of Catalyst H before the wet $H_2$ reduction step indicated that greater than 99% of the Pt was dispersed in the form of particles having a diameter of less than 7 Å and less than 1% of the Pt measured to be 7 Å or greater. Thus, the reduction step did not adversely affect the dispersion properties of the catalyst treated by the multi-step enhanced dispersion technique.

On the other hand, reduction of fresh catalyst leads to some agglomeration as shown by comparison of FIGS. 2 and 3. The unreduced fresh catalyst shown in FIG. 2 measured 90% of the platinum dispersed in particles below 7 Å, and 10% of 7 Å and larger, while the reduced fresh catalyst, shown in FIG. 3, measured only 80% of the platinum dispersed as below 7 Å diameter particles, with the remaining 20% measured to be particles of 8 Å average diameter.

Each of the catalysts A–H were subjected to SAT and ECAT runs as decribed above. The results, which show the correspondence between ECAT and SAT results, are given in Table IV. The results indicate that Catalysts C, D and H which have a Pt dispersion within the scope of this invention have the best activity maintenance.

The results further show that Catalyst E prepared by a somewhat different method than Catalysts C and D, but still within the scope of U.K. Patent Application No. 82-14147, exhibits poor activity, activity maintenance and Pt dispersion.

EXAMPLE 2

Effect of Oxychlorination on Dispersion and Activity Maintenance

A catalyst similar to Catalyst A and a Catalyst I similar to Catalyst C of Example 1 (calcined at 550° C.) were evaluated for their TCI values and activity maintenance using ECAT. These results were in turn compared with the results obtained when freshly prepared Catalyst I and D (of Example 1) were treated to enhance their dispersion by the procedures described below, to prepare Catalysts J and J'.

To prepare Catalyst J, Catalyst I was contacted with a series of gas compositions as described below flowing at a rate of 250 cc/g/min. for the given period of time. The remaining percentage of the gas composition was He gas. All steps were carried out at 510° C.

| Catalyst J Enhanced Dispersion Technique | | |
|---|---|---|
| Step | Gas Composition (%) | Duration (hrs) |
| Wet $H_2$ Reduction | 20% $H_2$, 2% $H_2O$ | 2 |
| Wet HCl Treat | 0.30% HCl, 2% $H_2O$ | 1.4 |
| Wet Oxy-chlorination | 0.30% HCl, 11% $O_2$, 2% $H_2O$ | 2.2 |
| Wet $O_2$ Post-treat | 11.3% $O_2$, 2% $H_2O$ | 1 |
| Wet $H_2$ Reduction | 20% $H_2$, 2% $H_2O$ | 1 |

Figure 7:
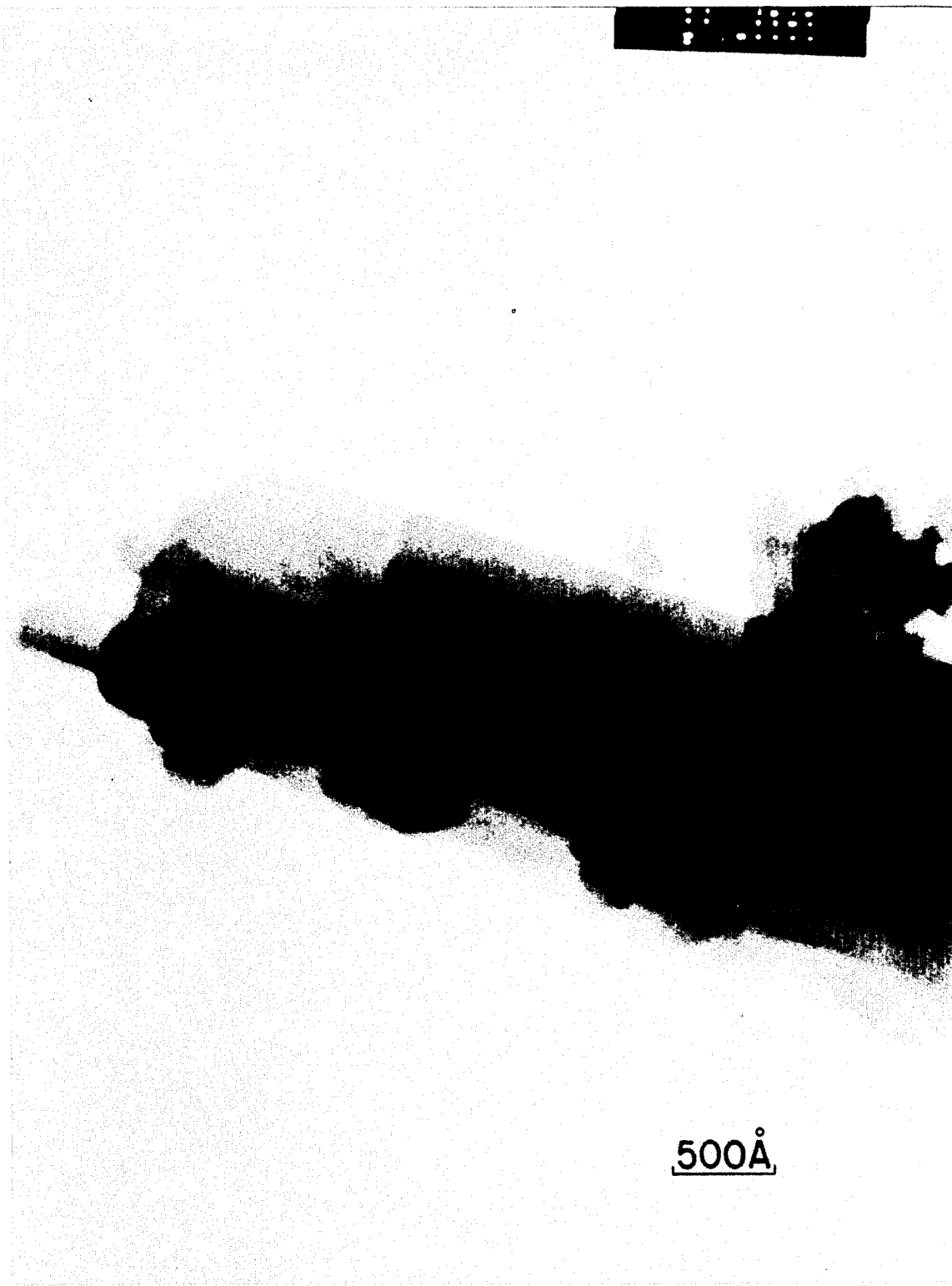
FIG. 7 represents an electron micrograph of the freshly prepared catalyst of FIG. 2 after treatment by a multistep technique involving a preferred oxychlorination step, where the scale is indicated on the micrograph.

No platinum agglomerates could be detected in an electron micrograph of the type of catalyst similar to Catalyst J shown in FIG. 7. This micrograph indicated that greater than 99% of the Pt was dispersed in the form of particles below the detection limit of less than 7 Å in diameter, and less than 1% measured to be about 7 Å or greater in diameter. Catalyst J exhibited better dispersion than the catalysts shown in FIGS. 2 and 3 which were not treated by the multi-step enhanced dispersion technique.

To prepare Catalyst J', catalyst D was contacted with a series of gas compositions as described below flowing at a rate of 32 cc/g/min. for the given period of time. (The remaining percentage of the gas composition was He gas.)

TABLE IV

| Catalyst No. | SAT Cycle Length (hrs.) | SAT Run at (°C.) | ECAT Benzene Yield (%) at 24 hours | | Pt Particle Size as Determined by Electron Microscopy |
|---|---|---|---|---|---|
| A* | 15 | 510 | 2 at 3 hrs. | | *** |
| B* | 146 | 510 | 3.9 | | 100–600Å particles 10–25Å crystal 15 × 40–70Å cylinders 6–8Å particles** |
| C | 350 | 510 | 8.3 | FIG. 2: | 7Å particles (10%) <7Å particles (90%) |
| D | 430 | 499 | 7.9 | FIG. 4: | 7Å particles (10%) <7Å particles (90%) |
| E* | 48 | 499 | 2 at 3 hrs | FIG. 5: | 100Å particles (70%) 10Å particles (5%) <7Å particles (25%) |
| F | 130 | 510 | 4.3 | | *** |
| G | 330 | 510 | 6.4 | | *** |
| H | 800 | 515 | 11.9 | FIG. 6: | 7Å particles (<1%) <7Å particles (>99%) |

*Comparative
**C. Besoukhanova et al., J. Chem. Soc., Faraday Trans. I, 77, 1595-1604 (1981)
***Not Available

| Catalyst J' Enhanced Dispersion Technique | | | |
|---|---|---|---|
| Step | Temp. (°C.) | Gas Composition (%) | Duration (hrs.) |
| Wet Calcination | 380 | 9.2% $O_2$, 2% $H_2O$ | 1 |
| Wet Calcination | 510 | 9.2% $O_2$, 2% $H_2O$ | 6.5 |
| | | Intermediate Air Cooling | |
| Wet $O_2$ Burn | 480 | 2% $O_2$, 2% $H_2O$ | 7.5 |
| Wet $O_2$ Burn | 510 | 5% $O_2$, 2% $H_2O$ | 1.5 |
| Wet Oxychlorination | 510 | 9.7 $O_2$, 0.2% HCl, 2% $H_2O$ | 2.5 |
| Wet $O_2$ Post-Treat | 510 | 9.3% $O_2$, 2% $H_2O$ | 1 |
| Wet $H_2$ Reduction | 510 | 20% $H_2$, 2% $H_2O$ | 1.4 |

Table V indicates the TCI, feed conversion and benzene yield as determined by ECAT (using n-hexane as feed, at 518° C., a space velocity of 50 w/w/hr., a $H_2$/oil ratio of 6 and at 725 kPa (gauge pressure) for Catalyst A, I, J, and J'. The results indicate that the TCI is a measure of dispersion, with increasing TCI correlating with improving dispersion, and that the enhanced dispersion process improves the Pt dispersion, catalyst activity, TCI and catalyst activity maintenance of the fresh catalyst.

TABLE V

| | Catalyst | | | | | | | | | | | |
|---|---|---|---|---|---|---|---|---|---|---|---|---|
| | A* | | | I | | | J | | | J' | | |
| Time on Oil (hrs.) | Conv. wt. % | Benz. wt. % | TCI | Conv. wt. % | Benz. wt. % | TCI | Conv. wt. % | Benz. wt. % | TCI | Conv. wt. % | Benz. wt. % | TCI |
| 1–3 | 26.2 | 21.1 | 1.54 | 55.6 | 43.4 | 1.98 | 37.4 | 24.2 | 1.60 | 67.8 | 55.6 | 1.99 |
| 5–7 | 16.3 | 13.0 | 1.39 | 47.7 | 37.0 | 2.00 | 40.3 | 28.0 | 1.71 | 60.3 | 51.6 | 2.10 |
| 13–15 | 18.4 | 14.1 | 1.43 | 38.1 | 28.5 | 1.96 | 37.3 | 32.6 | 1.96 | 54.6 | 46.3 | 2.22 |
| 20–25 | 19.3 | 15.8 | 1.46 | 39.9 | 30.1 | 1.98 | 41.3 | 34.1 | 1.98 | 55.2 | 46.8 | 2.27 |
| 31–37 | 18.4 | 15.2 | 1.46 | 40.0 | 29.7 | 1.95 | 51.4 | 40.3 | 2.08 | 53.8 | 46.0 | 2.25 |
| 40–46 | 18.0 | 13.6 | 1.39 | 35.1 | 28.5 | 1.97 | 44.2 | 36.3 | 1.96 | 51.9 | 44.6 | 2.29 |
| 50–55 | 14.9 | 12.5 | 1.30 | 34.2 | 27.6 | 1.97 | 43.6 | 35.0 | 1.97 | 51.8 | 43.8 | 2.31 |
| 58–62 | 13.8 | 11.4 | 1.25 | 38.4 | 28.8 | 1.93 | 42.8 | 33.8 | 1.93 | 51.2 | 43.6 | 2.29 |

*Comparative

EXAMPLE 3

Effect of pH on Catalyst Properties

I.

Preparation of Dispersed Pt Catalyst when Slurried Potassium-Exchanged Zeolite L Base Has pH less than 10.5

A stirred slurry of 2.5 g of the zeolite used for Catalyst E of Example 1 and 70 ml distilled water was prepared and the slurry had a pH of 10.0. Prior to metal loading an identical zeolite slurry was treated with 0.1N KOH so that that pH of the slurry was 11.3, and another washed with 400 ml distilled water until the slurry had a pH equal to 9.1. Each slurry was then loaded with 0.6 wt% Pt via ion-exchange as described in Example 1. Samples of each were dried and calcined at 350° C. in air, and reduced in the microreactor and their performance (ECAT) was evaluated. The results are provided in Table VI.

TABLE VI

| pH | wt. % Benzene at 24 hours |
|---|---|
| 11.3 | 8.0 |
| 10.0 | 5.1 |
| 9.1 | 3.5 |

Figure 8:
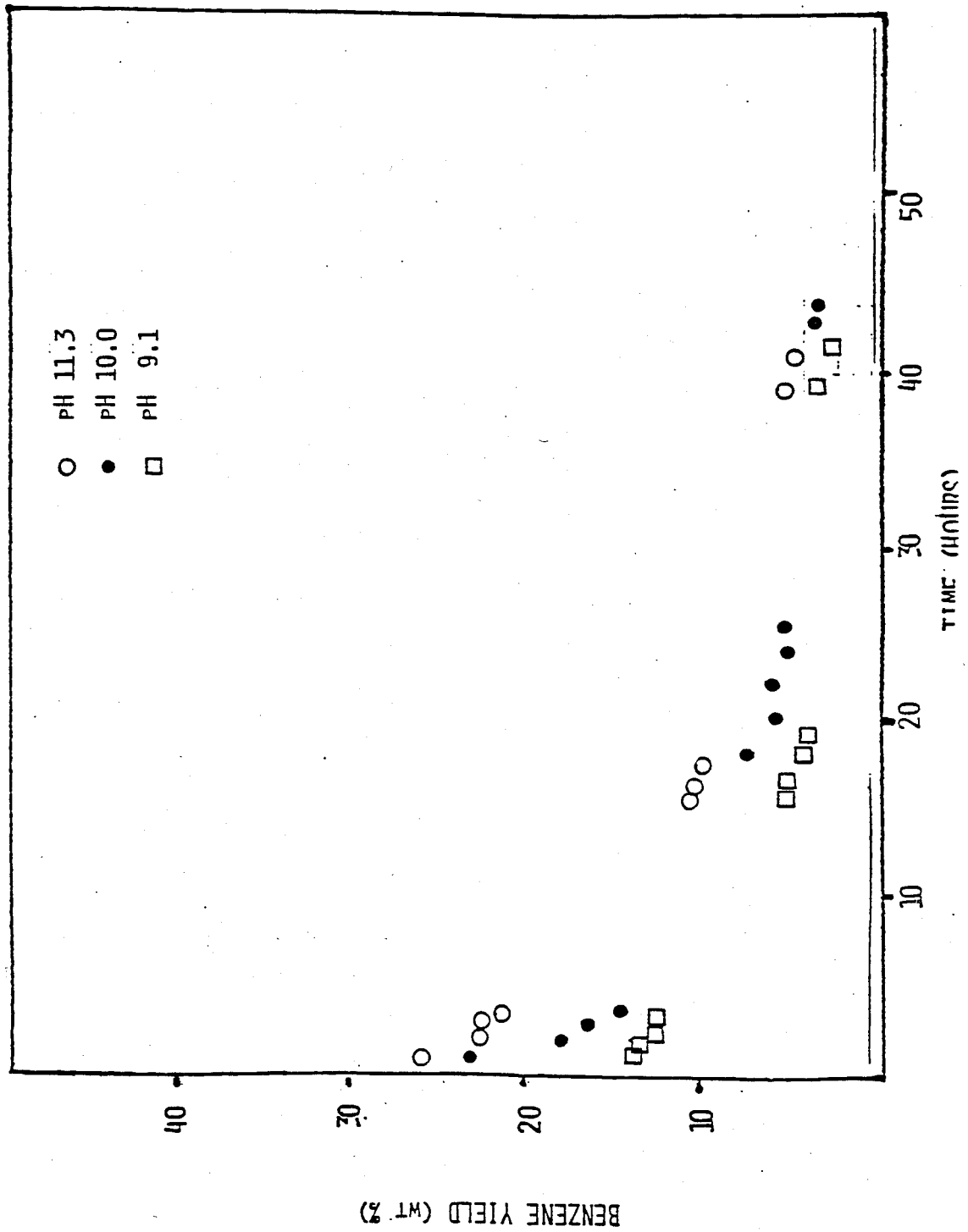
FIG. 8 represents a graph of benzene yield versus time for three catalysts of a type similar to the one in FIG. 5. The original zeolite base was treated to obtain two additional pH levels prior to platinum loading by ion exchange of the three different bases.

FIG. 8 illustrates the activity maintenance of these three catalyst as determined by ECAT.

II.

Preparation of Dispersed Pt Catalyst when Slurried Potassium-Exchanged Zeolite L Base Has pH greater than 10.5

Exactly as described above three catalysts were prepared using the zeolite base of Catalyst D of Example 1. When slurried, the zeolite base had a pH of 10.8, and 11.3 after KOH addition, and 9.3 after washing, respectively. Samples of each were dried and calcined at 350° C. in air, and reduced in the microreactor and their performance (ECAT) was evaluated, as indicated in Table VII.

TABLE VII

| pH | wt. % Benzene at 24 hours |
|---|---|
| 11.3 | 8.7 |
| 10.8 | 11.0 |
| 9.3 | 8.4 |

Figure 9:
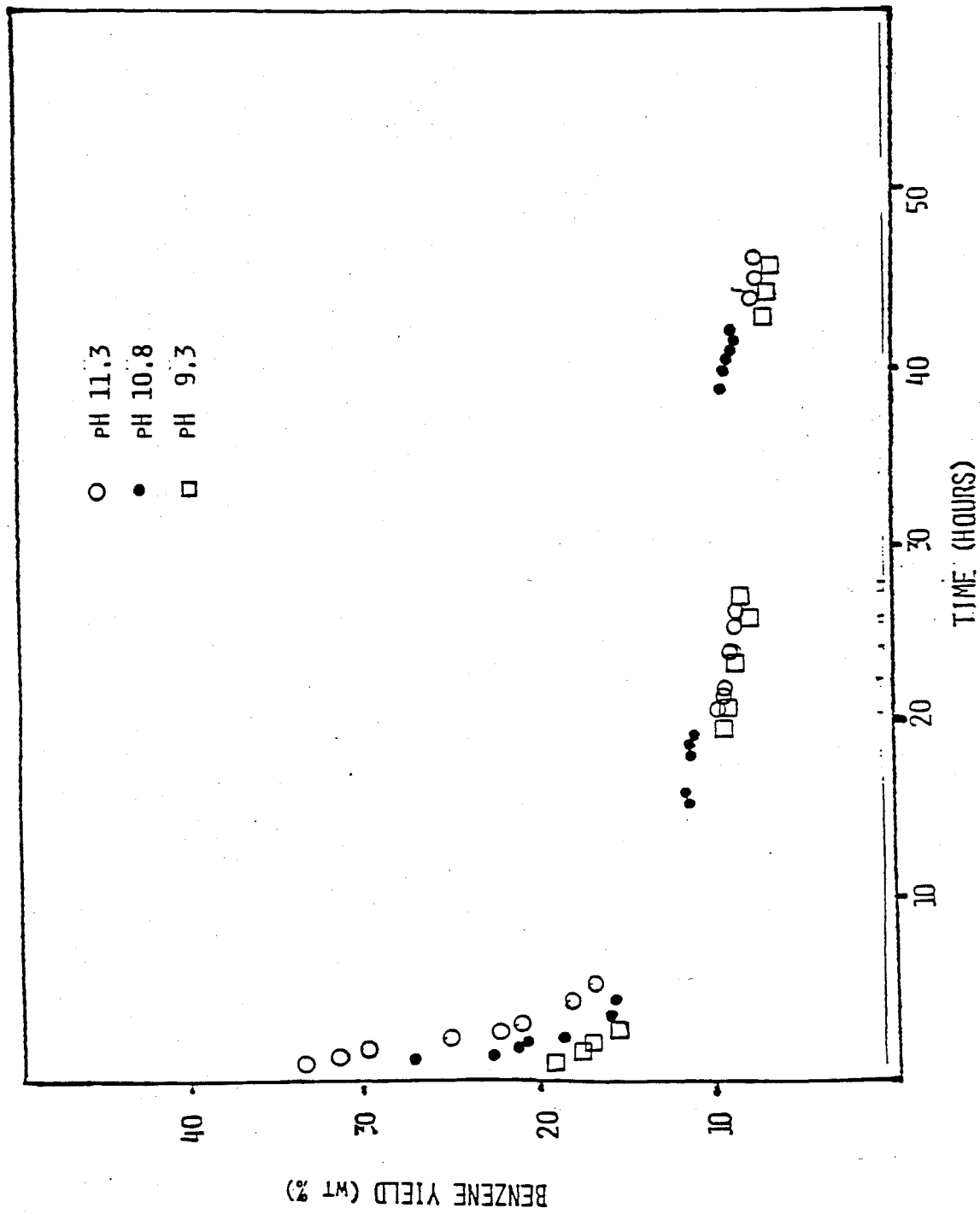
FIG. 9 represents a graph of benzene yield versus time for three catalysts of a type similar to the one in FIG. 4. The original zeolite base was treated to obtain two additional pH levels prior to platinum loading by ion exchange of the three different bases.

FIG. 9 illustrates the activity maintenance of these three catalysts as determined by ECAT.

EXAMPLE 4

High Loading of Noble Metal

A first zeolite L (small crystal size) having an average particle size of about 0.1 micron was prepared by the following method:

Slurry A was made by mixing in a 1 gallon Hobart mixer 100.7 g KOH.½$H_2O$, 81 g $Al_2O_3.3H_2O$, 1469 g K Sil 6 (potassium silicate of P.Q. Corp.), 126.4 g alum $(Al_2(SO_4)_3.17\ H_2O)$ and 723 g $H_2O$. After thorough homogenization the sample was placed in a six gallon polypropylene can. A second identical batch was then mixed and added to the can, which was then placed in an air oven at 100° C. The total composition had a stoichiometry of:

$3K_2O:Al_2O_3:9SiO_2:135H_2O.$

Slurry B having the same stoichiometry was made two days later, but in a much larger batch (36 kilograms) consisting of:
1450 g KOH.½$H_2O$
1167 g $Al_2O_3.3\ H_2O$ (Alcoa C31)
21,147 g K Sil 6 (P.Q. Corp.)
1820 g alum $(Al_2(SO_4)_3.17H_2O)$
10,416 g $H_2O$.

After mixing in a commercial Hobart mixer, the gel was placed in a six-gallon polypropylene can. To this can was then added 1800 g of slurry A, which had now been hot aged for 2 days and showed minor zeolite L crystallization. After thorough mixing, the can was sealed and placed in an air oven at 98° C. After reacting for 66 hours the container was cooled, and the contents filtered and washed. Analysis of the sample showed excellent zeolite L by x-ray diffraction analysis, and chemical analysis gave a composition of:

$$1.04K_2O:Al_2O_3:5.3SiO_2$$

The BET $N_2$ surface area was 291 m$^2$/g. The sample was reslurried in deionized water, and the pH was adjusted to 8.5 with a few drops of HCl, then filtered and dried at 110° C. Chemical analysis showed no change in the Si/Al ratio but the K/Al ratio was now 0.98. The BET nitrogen surface area measurement increased to 380 m$^2$/g. Scanning electron microscope analysis showed the sample to comprise 0.1 to 1 micron agglomerates of microcrystals less than 0.1 micron in diameter.

A second zeolite L (large crystal size) which was the zeolite used to prepare Catalyst C of Example 1 was also employed.

The small crystal size zeolite was loaded with 0.92% Pt (Catalyst K) and with 3.3% Pt (Catalyst L). Catalyst K was prepared by slurrying 2.5 g of the small crystal size zeolite in 300 cc $H_2O$ and adding Pt(NH$_3$)$_4$Cl$_2$ solution containing 23 mg Pt during a 2.5 hour period. Following the addition, stirring was continued overnight. The mixture was then filtered and the loaded potassium-exchanged zeolite L was dried at about 120° C. for 20 hours, then pressed and screened to 20/40 mesh and calcined in flowing 20% $O_2$ (80% He) at 200° C. for 1 hour, then at 350° C. for 3 hours.

Catalyst L was prepared by placing 6 g of the small crystal size zeolite at 20/40 mesh in a wire-mesh basket and drying it at about 120° C. overnight. The wire basket containing the zeolite was removed from the drying oven and immediately immersed for 5 seconds in a solution of Pt(NH$_3$)$_4$Cl$_2$ containing 11.7 mg Pt/cc. Following the immersion-loading, the basket was withdrawn from the solution and placed in a drying oven at about 120° C. overnight. The catalyst was then placed in a tube furnace and treated in flowing He at 100° C. for 20 hours, then 20% $O_2$ (80% He) at 200° C. for 2 hours, and then at 350° C. for 3 hours. The catalyst was analyzed and found to contain 3.3% Pt.

The large crystal size zeolite was loaded with 0.6% Pt (Catalyst M) and with 2.8% Pt (Catalyst N). Catalyst M was prepared by slurrying 150 g of the zeolite in 2000 cc $H_2O$ and adding Pt(NH$_3$)$_4$Cl$_2$ solution containing 900 mg Pt during a 6 hour period. Following the addition, stirring was continued overnight. The mixture was then filtered and the loaded potassium-exchanged zeolite L was dried at about 120° C. for 20 hours, then pressed and screened to 20/40 mesh and calcined in flowing 10% $O_2$ (90% He) at temperatures up to and including 350° C.

Catalyst N was prepared by slurrying 7 g of the zeolite in 300 cc $H_2O$ and adding Pt (NH$_3$)$_4$Cl$_2$ solution during a 3 hour period. Following the addition, stirring was continued overnight. The mixture was then filtered and the loaded potassium-exchanged zeolite L was dried at about 120° C. for 20 hours, then pressed and screened to 20/40 mesh. The catalyst was then placed in a tube furnace and treated in flowing He at 100° C. for 20 hours, then 20% $O_2$ (80%He) at 200° C. for 2 hours, and then at 350° C. for 3 hours. The catalyst was analyzed and found to contain 2.8% Pt.

Each catalyst was mixed in an amount of 0.2 g with 0.8 g of $SiO_2$ of the same mesh and charged into a stainless steel downflow reactor of 1.3 cm outer diameter and 1 cm inner diameter equipped with a thermocouple. Each was reduced under flowing $H_2$ at about 525° C. or less and then contacted with a feed containing 20% methylcyclopentane and 80% n-hexane at 510° C. at 700 kPa (gauge), a space velocity of 50 w/w/hr and a $H_2$/hydrocarbon ratio of 6. The results using the catalysts are shown in Table VIII. The data indicate that the 3.3% Pt loaded catalyst on the zeolite with small average crystalline size has better activity for a sustained period of time than the 0.92% Pt loaded catalysts. The same general trend was observed when the feed was 100% n-hexane for both benzene and carbocyclic isomer production.

TABLE VIII

| | Benzene Yield at 3 hours (%) | TCI at 3 hours | Benzene Yield at 24 hours (%) | TCI at 24 hours |
|---|---|---|---|---|
| Catalyst K | 5.2 | 1.46 | — | — |
| Catalyst L | 26 | 1.18 | 22 | 1.43 |
| Catalyst M | 18.5 | 1.72 | 8.3 | 1.72 |
| Catalyst N | 1.1 | 0.54 | — | — |

In contrast, Table VIII shows that the 2.8% Pt loaded catalyst is inferior to the 0.6% Pt loaded catalyst in benzene yield when the zeolite base has a larger average crystal particle size of at least 0.5 micron. The terminal cracking indices of catalysts M and N confirmed this observation of better benzene yield with a higher index. The observation that the 2.8% Pt loaded catalyst is inferior is believed to be due to the large crystal size of the zeolite.

EXAMPLE 5

Barium-Exchanged Zeolite Catalysts (Comparative)

Catalyst similar to those described in Belgian Pat. No. 895,778 and 895,779 were prepared as follows. A zeolite similar to Catalyst C of Example 1 was stirred in an aqueous solution of barium nitrate for three hours, filtered, washed and dried and calcined at 500° C. It was then loaded with 0.6% Pt by ion exchange and calcined at 350° C. This catalyst was labelled Catalyst O. Another catalyst (Catalyst P) was similarly prepared except that the barium nitrate solution concentration used for the exchange was ¼ of that used in the preparation of Catalyst O. Catalysts O and P were compared, using ECAT with n-hexane feed, with Catalyst Q, which was similar except that potassium-exchanged zeolite L was employed. The results are indicated in Table IX.

TABLE IX

| Catalyst | TCI | ECAT Benzene Yield (wt. %) at 20 hrs. on oil |
|---|---|---|
| O | 0.55 | 1.1 |
| P | 0.88 | 9.2 |
| Q | 1.60 | 13.2 |

EXAMPLE 6

Preparation of Catalyst with Binder

A total of 50 cc $H_2O$, 72 g of Catalyst C of Example 1 and 8 g of Georgia Kaolin clay (type R) were mixed until the mixture was homogeneous and minimal particle contacts existed between clay crystals as detected by scanning electron microscopy (SEM). This mixture, containing 10% by weight of the clay, was formed into ⅛ inch pellets by methods described in the art. The formed pellets were then heat-treated at 500° C. in room air. After heating, the mixture was sieved into 20/40 mesh particles. This catalyst was designated as Catalyst R. The procedure described above was used to prepare Catalyst S, except that the binder precursor was boehmitic alumina rather than kaolin.

Before use as a catalyst material, Catalysts R and S were charged into a reactor in an amount of 1.6 g and 3.8 g, respectively. Then 2% of oxygen gas was introduced into the reactor at a flow rate of 200 cc/min. in the presence of 2% water at 480° C. for 2.5 hours. Then oxygen concentration was increased from 2.2 to 11% and the temperature of the reactor was raised to 510° C. This treatment was continued for 1.5 hours. HCl was added at 0.25% to the gas stream, and this oxychlorination step was carried out for 2.5 hours. At this point HCl flow was stopped and the catalysts were contacted at 510° C. with $O_2$ flowing at 200 cc/min. for one hour in the presence of 2% water. After oxygen was purged from the reactor the catalyst was reduced with 20% hydrogen flowing at 200 cc/min. in the presence of 2% water at 510° C. for 1.5 hours. The resulting dispersed bound catalysts from Catalysts R and S were designated T and U, respectively.

Catalysts R–U were individually analyzed by ECAT as described in Example 1 except that the feed contained 100% n-hexane. The results, indicated in FIG. 12, show that catalyst activity and activity maintenance of the dispersed bound catalysts exceeded substantially that of the non-dispersed bound catalysts.

What is claimed is:

1. A process for reforming naphtha which comprises (a) contacting the naphtha in the presence of hydrogen at elevated temperatures with a catalyst comprising a binder, a type L zeolite containing exchangeable cations of which at least 75% are selected from the group consisting of lithium, sodium, potassium, rubidium, cesium, calcium and barium, at least one Group VIII noble metal, the particles of which are well dispersed over the surface of the catalyst and at least 90% of the noble metal associated with the zeolite is in the form of particles having a diameter of less than about 7 Å; and (b) recovering reformed product.

2. The process of claim 1 wherein the binder is derived from boehmitic alumina.

3. The process of claim 1 wherein the binder is derived from kaolin.

4. The process of claim 1 wherein the exchangeable cation is potassium.

5. The process of claim 4 wherein the noble metal is platinum.

* * * * *